(12) United States Patent
Sekizawa

(10) Patent No.: US 8,339,415 B2
(45) Date of Patent: Dec. 25, 2012

(54) APPARATUS, METHOD, AND MEDIUM FOR ENCODING AND DISPLAYING COMPOSITE IMAGES

(75) Inventor: Hidehiko Sekizawa, Tokyo (JP)

(73) Assignee: Sony Corporation, Tokyo (JP)

( * ) Notice: Subject to any disclaimer, the term of this patent is extended or adjusted under 35 U.S.C. 154(b) by 84 days.

(21) Appl. No.: 11/473,776

(22) Filed: Jun. 23, 2006

(65) Prior Publication Data

US 2007/0002372 A1 Jan. 4, 2007

(30) Foreign Application Priority Data

Jun. 29, 2005 (JP) .............................. P2005-189395

(51) Int. Cl.
*G09G 5/00* (2006.01)
(52) U.S. Cl. ....................................................... 345/619
(58) Field of Classification Search ........................ None
See application file for complete search history.

(56) References Cited

U.S. PATENT DOCUMENTS

| | | | |
|---|---|---|---|
| 6,108,005 A | 8/2000 | Starks et al. | |
| 6,161,114 A * | 12/2000 | King et al. | 715/202 |
| 6,222,947 B1 * | 4/2001 | Koba | 382/284 |
| 6,377,625 B1 | 4/2002 | Kim | |
| 6,631,205 B1 | 10/2003 | Melen et al. | |
| 6,765,568 B2 | 7/2004 | Swift et al. | |
| 6,944,328 B2 | 9/2005 | Yoshida | |
| 7,064,754 B2 | 6/2006 | Iizuka et al. | |
| 7,181,061 B2 | 2/2007 | Kawano et al. | |
| 7,529,400 B2 | 5/2009 | Katata et al. | |
| 7,679,616 B2 | 3/2010 | Nomura et al. | |
| 7,734,085 B2 | 6/2010 | Nomura et al. | |
| 7,791,640 B2 | 9/2010 | Yoshida | |
| 7,804,995 B2 | 9/2010 | Lipton et al. | |
| 2002/0122585 A1 | 9/2002 | Swift et al. | |
| 2003/0032033 A1 | 2/2003 | Anglin et al. | |
| 2005/0041120 A1 * | 2/2005 | Miller | 348/239 |
| 2005/0140679 A1 * | 6/2005 | Kaneda | 345/441 |
| 2005/0147309 A1 * | 7/2005 | Katata et al. | 382/239 |

(Continued)

FOREIGN PATENT DOCUMENTS

JP 05-030538 2/1993

(Continued)

OTHER PUBLICATIONS

U.S. Appl. No. 11/922,901, filed Dec. 21, 2007, Hidehiko Sekizawa.

(Continued)

*Primary Examiner* — Daniel Hajnik
(74) *Attorney, Agent, or Firm* — Robert J. Depke; Rockey, Depke & Lyons, LLC

(57) ABSTRACT

An image processing apparatus is disclosed which can integrate a plurality of images without depending upon header information of a file. Information of one or more images is inputted as a main image or images. Incidental information relating to the inputted main image or images such as information necessary for integration of a plurality of images is encoded into a first encoded image which can be discriminated based on a visual characteristic and a second encoded image such as a barcode which can be discriminated by an image analysis. The inputted main image or images and the first and second encoded images are integrated so as to be displayed in compartmentalized respective regions of a display screen, and header information is added to the composite image to produce structured image information.

16 Claims, 13 Drawing Sheets

U.S. PATENT DOCUMENTS

2005/0149399 A1* 7/2005 Fukunaga et al. ............ 705/14
2009/0091612 A1 4/2009 Sekizawa et al.
2010/0295930 A1 11/2010 Ezhov

FOREIGN PATENT DOCUMENTS

| | | |
|---|---|---|
| JP | 05-30538 | 2/1993 |
| JP | 09-160143 | 6/1997 |
| JP | 2000-050043 | 2/2000 |
| JP | 2002-016787 | 1/2002 |
| JP | 2003-111009 | 4/2003 |
| JP | 2004-088420 | 3/2004 |
| JP | 2004-129186 | 4/2004 |
| JP | 2004-173085 | 6/2004 |
| JP | 2004-343549 | 12/2004 |
| JP | 2005-065187 | 3/2005 |
| JP | 2005-252989 | 9/2005 |
| WO | WO 03/092305 | * 11/2003 |

OTHER PUBLICATIONS

U.S. Appl. No. 11/922,742, filed Dec. 20, 2007, Hidehiko Sekizawa.

* cited by examiner

APPARATUS, METHOD, AND MEDIUM FOR ENCODING AND DISPLAYING COMPOSITE IMAGES

CROSS REFERENCES TO RELATED APPLICATIONS

The present invention contains subject matter related to Japanese Patent Application JP 2005-189395 filed in the Japanese Patent Office on Jun. 29, 2005, the entire contents of which being incorporated herein by reference.

BACKGROUND OF THE INVENTION

1. Field of the Invention

This invention relates to an image processing apparatus, an image processing method, an image reproduction apparatus, an image reproduction method, a computer-readable recording medium, an image processing program, an image reproduction program and an image sheet.

2. Description of the Related Art

A technique for handling a plurality of image data in an integrated manner is used, for example, in applications in which a plurality of image data which form images are investigated through comparison or for integrated displaying applications such as stereoscopic display or panorama display. In order to handle a plurality of image data in an integrated manner, a plurality of image data are needed. Further, various kinds of incidental information relating to the image data such as, for example, information upon image pickup of the individual images and information regarding in what combination the information should be handled are needed. For example, for the stereoscopic display of an image, identification information representing that the data is of an image, information of the eye point (left/right eye or image pickup spot), horizontal and vertical eye point numbers, an overlapping manner in a horizontal direction (horizontal shift amount) and so forth are needed for each image. Meanwhile, for the panorama display, identification information representing that the data is of a panorama image, information representing at which position (in order) the image is in the panorama and so forth are needed for each image.

Such information for handling images in an integrated manner as described above is frequently handled by various techniques. In particular, according to a technique, as seen in FIG. 18, such information as described above is described in a file 112 for exclusive use separate from files 111-1, ..., 111-N of individual data and is transferred together with such files 111 (111-1 to 111-N) of the image data. According to another technique, as seen in FIG. 19, a plurality of images to be integrated are physically connected to each other to form a single integrated image 121, and information for handling the images in an integrated manner is incorporated as integration header information 122 into a file.

For example, Japanese Patent Laid-open No. Hei 5-30538 discloses recording information that the data is of an image, identification information of whether the image is a left image or a right image and other information as header information individually for image data for left and right images. Upon processing on a recording and reproduction apparatus or a transmission apparatus, image data for left and right images in pair are handled as a single image handling unit. Consequently, such a defective situation that one of image data of left and right images in pair is erased or transmitted in error is prevented.

SUMMARY OF THE INVENTION

However, according to the former method wherein information for handling images in an integrated manner is stored in a different file for exclusive use, if, upon transfer of files, even only one of the files is not transferred in failure, then it is very difficult to process the images in an integrated manner. On the other hand, according to the latter method which uses integration header information, if the integration header information is broken or lost, then it is very difficult to process the images in an integrated manner. In the latter case, for example, if an integrated image is transferred in the form of a printed matter, then it is possible to read the image of the printed matter using a scanner to obtain electronic data of the image. However, even if the electronic data can be obtained in this manner, since the header information is not available at the point of time, a process wherein images from the image data read in by the scanner are handled in an integrated manner cannot be performed.

The latter method described above has a further problem that, as seen in FIG. 20, when an integrated image 131 is printed, if it is printed in accordance with the size of a print paper sheet 132, then part of the image sometimes misses.

Therefore, it is desirable to provide an image processing apparatus, an image processing method and an image processing program which can produce a composite image which can convey incidental information relating to a main image without transmitting the incidental information to the main image directly through a visual sense to a user who enjoys the main image and without depending upon header information.

Also it is desirable to provide an image reproduction apparatus, an image reproduction method, an image reproduction program, an image sheet and a computer-readable recording medium by which a main image can be reproduced without depending upon header information.

According to an embodiment of the present invention, there is provided an image processing apparatus including an image inputting section for inputting information of one or more images as a main image or images, an encoding section for encoding incidental information relating to the inputted main image or images into an image, and an image integration section for integrating the inputted main image or images and the encoded image obtained by the encoding section so as to be displayed in compartmentalized respective regions of a display screen.

In the image processing apparatus, a composite image can be produced which can convey the incidental information relating to the main image or images directly through the visual sense to a user who appreciates the main image or images or can transmit the incidental information relating to the main image or images to a reproduction apparatus so as to be reproduced without depending upon header information.

The encoding section encodes the incidental information into an image which can be discriminated based on a visual characteristic. In particular, since the incidental information is encoded into an image which can be discriminated based on a visual characteristic such as a color or a shape, the composite image can convey the incidental information directly through the visual sense to the user who appreciates the main image or images.

Alternatively, the encoding section may encode the incidental information into an image which can be discriminated by a visual analysis. Where the incidental information is encoded into such an image as just described, the composite image can transmit the incidental information relating to the main image or images to a reproduction apparatus without depending upon header information so that the reproduction apparatus can reproduce the main image or images.

Or else, the encoding section may encode the incidental information into a first encoded image which can be discriminated based on a visual characteristic and a second encoded image which can be discriminated by an image analysis. Since the amount of information which can be encoded is restricted significantly if only the first encoded image which can be discriminated based on a visual characteristic is used, it is used together with the second encoded image which can be discriminated by an image analysis. Therefore, in addition to the advantage that the incidental information can be conveyed directly through the visual sense to the user who appreciates the main image or images, another advantage that the overall amount of information which can be encoded can be increased significantly is achieved. It is to be noted that also the first encoded image which can be discriminated based on the visual sense may be formed as an encoded image which can be discriminated by an image analysis.

Meanwhile, the image integration section may vary the size of the encoded image to be integrated with the main image or images so that the longitudinal and lateral sizes of the composite image may exhibit a predetermined aspect adjustment ratio. Where the image integration section is configured in this manner, the entire composite image can be printed such that it is held just on a printing paper sheet.

The image processing apparatus may further include an encoding section for compression encoding the composite image obtained by the image integration section, and a multiplexing section for adding the substance of the incidental information as header information to the composite image compression encoded by the encoding section to produce structured image information. Where the image processing apparatus is configured in this manner, structured image information with a header can be obtained. This makes it possible for a reproduction apparatus to reproduce the main image or images even if the reproduction apparatus does not have a function of decoding incidental information encoded in an image.

According to another embodiment of the present invention, there is provided an image processing apparatus including a composite image inputting section for inputting a composite image formed by integrating one or more main images and an encoded image obtained by encoding incidental information relating to the main image or images integrating the inputted main image or images and the encoded image obtained by the encoding section so as to be displayed in compartmentalized respective regions of a display screen, a demultiplexing section for demultiplexing the main image or images and encoded image from the inputted composite image, a decoding section for decoding the encoded image demultiplexed by the demultiplexing section to reproduce incidental information, and a restoration section for producing header information based on the incidental information decoded by the decoding section and adding the header information to the main image or images to restore structured image information.

In the image processing apparatus, when the header information of a file is deleted or broken, it is possible to decode the incidental information from the encoded image, use the incidental information to restore the original header information and restore the file with the header information.

According to a further embodiment of the present invention, there is provided an image reproduction apparatus including a composite image inputting section for inputting a composite image formed by integrating one or more main images and an encoded image obtained by encoding incidental information relating to the main image or images integrating the inputted main image or images and the encoded image obtained by the encoding section so as to be displayed in compartmentalized respective regions of a display screen, a demultiplexing section for demultiplexing the main image or images and the encoded image from the inputted composite image, a decoding section for decoding the encoded image demultiplexed by the demultiplexing section to reproduce incidental information, and an image conversion section for performing a process for reproduction for the one or more main images demultiplexed by the demultiplexing section based on the incidental information decoded by the decoding section.

With the image reproduction apparatus, a process for reproducing the main image or images can be performed without depending upon header information.

According to a still further embodiment of the present invention, there is provided a computer-readable recording medium in or on which structured information including a composite image formed by integrating one or more main images and an encoded image obtained by encoding incidental information relating to the main image or images integrating the inputted main image or images and the encoded image obtained by the encoding section so as to be displayed in compartmentalized respective regions of a display screen. If the structured image information is read in from the recording medium and the encoded image of the incidental information is demultiplexed from the composite image extracted from the structured image information and is then decoded, then a process for reproduction of the main image or images can be performed without depending upon header information.

According to a yet further embodiment of the present invention, there is provided an image sheet on which one or more main images and an encoded image obtained by encoding incidental information relating to the main image or images are disposed in regions different from each other. If the image sheet is read by means of a scanner and the encoded image of the incidental information is demultiplexed from the image read in from the image sheet and is then decoded, then a process for reproduction of the main image or images can be performed without depending upon header information.

With the image processing apparatus, image reproduction apparatus, computer-readable recording medium and image sheet, the incidental information relating to the main image or images can be conveyed directly through the visual sense to a user who appreciates the main image or images. Further, the incidental information relating to the main image or images can be transmitted to a reproduction apparatus without depending upon header information so that the reproduction apparatus can reproduce the main image or images. Further, the entire composite image can be printed on a printing paper sheet such that it is held just on the printing paper. Further, when header information of an image file is deleted or broken, it is possible to decode the incidental information to restore the original header information and restore the file with the header information.

The above and other features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

Figure 1:
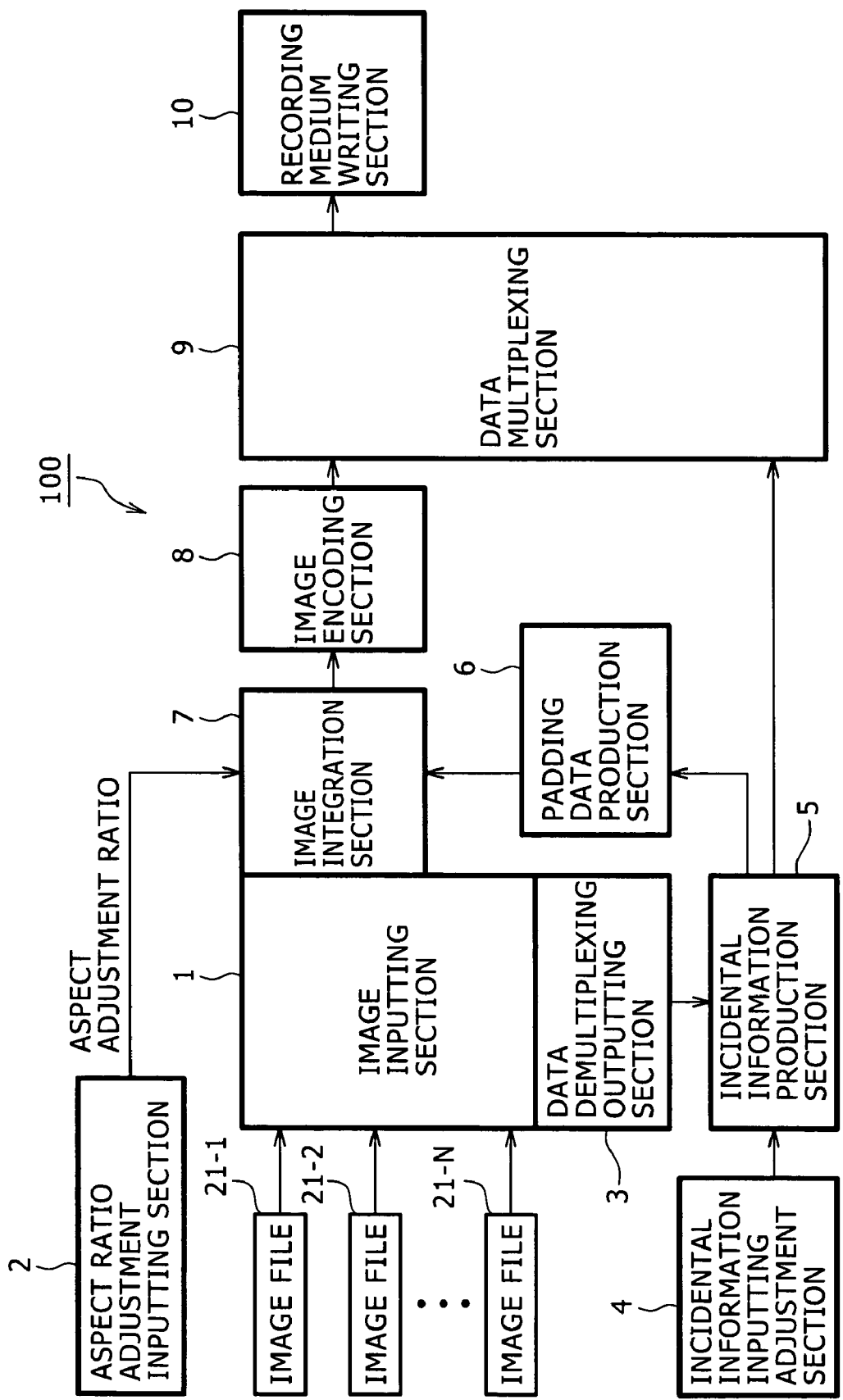
FIG. 1 is a block diagram showing a general configuration of an image processing apparatus to which an embodiment of the present invention is applied.

Referring to FIG. 1, there is shown a general configuration of an image processing apparatus to which an embodiment of the present invention is applied.

The image processing apparatus 100 shown includes an image inputting section 1, an aspect ratio adjustment inputting section 2, a data demultiplexing outputting section 3, and an incidental information inputting adjustment section 4. The image processing apparatus 100 further includes an incidental information production section 5, a padding data production section 6, an image integration section 7, an image encoding section 8, a data multiplexing section 9, and a recording medium writing section 10.

The image inputting section 1 is used to input one or more image files 21 (21-1, 21-2, . . . , 21-N) to which incidental information relating to respective image information (main images) is added as header information.

The data demultiplexing outputting section 3 demultiplexes header information from the image files 21 inputted from the image inputting section 1 and outputs the demultiplexed header information to the incidental information production section 5.

The incidental information inputting adjustment section 4 adjusts incidental information such as a parameter value added as header information of the image files 21 to an optimum value and inputs incidental information of a new item which is not included in the header information. Further, the incidental information inputting adjustment section 4 adjusts the value of incidental information outputted from an image integration section not shown and newly inputted after confirmation on a display section or the like to a further optimum value.

The incidental information production section 5 produces incidental information to be outputted to the padding data production section 6 and the data multiplexing section 9 based on header information outputted from the data demultiplexing outputting section 3 and information supplied thereto from the incidental information inputting adjustment section 4. Here, part of the incidental information which is to be encoded with padding data from within all incidental information is outputted to the padding data production section 6 while, for example, all incidental information is outputted to the data multiplexing section 9.

The padding data production section 6 encodes incidental information supplied thereto from the incidental information production section 5 into an image (first encoded image) whose significance can be discriminated, for example, based on a visual characteristic such as a color or a shape by a human being to produce padding data. Or, the padding data production section 6 encodes incidental information supplied thereto from the incidental information production section 5 into an image (second encoded image) in the form of a visible symbol such as, for example, a one-dimensional barcode or a two-dimensional barcode which can be discriminated by an image analysis to produce padding data. The padding data are used to fill up a free region which appears when main images are disposed in a two-dimensional space which has a predetermined aspect ratio.

The aspect ratio adjustment inputting section 2 is used to input an aspect adjustment ratio for a composite image to be produced by the image integration section 7. The aspect adjustment ratio is inputted in accordance with an aspect ratio, for example, of a photographic printing paper sheet.

The image integration section 7 integrates main images of image files 21 inputted from the image inputting section 1 and padding data, that is, first and second encoded images, produced by the padding data production section 6 to produce composite image data having an aspect adjustment ratio inputted from the aspect ratio adjustment inputting section 2. Alternatively, an arrangement position adjustment section for encoded images not shown may be used to adjust the position of a composite image at which the encoded image should be disposed to produce composite image data.

The image encoding section 8 compression encodes a composite image outputted from the image integration section 7 in accordance with a predetermined system such as, for example, the JPEG system.

The data multiplexing section 9 multiplexes incidental information obtained by the incidental information production section 5 as header information with a composite image compression encoded by the image encoding section 8 to produce an image file of structured image information.

The recording medium writing section 10 writes an image file produced by the data multiplexing section 9 on or into a nonvolatile recording medium (for example, an EEPROM) which can be written and read by a computer or the like.

Now, operation of the image processing apparatus 100 is described.

Before an image file is inputted, an aspect adjustment ratio conforming to an aspect ratio of a photographic printing paper sheet to be used is inputted from the aspect ratio adjustment inputting section 2 so as to be set as an aspect adjustment ratio for image integration to the image integration section 7. Further, as occasion demands, an adjustment value of incidental information or new incidental information which is not included in any header information is inputted and set by the incidental information inputting adjustment section 4.

Thereafter, one or more image files 21 are inputted from the image inputting section 1, and main images of the image files 21 are supplied to the image integration section 7. Further, header information of the image files 21 are demultiplexed and extracted by the data demultiplexing outputting section 3 and outputted to the incidental information production section 5.

When the incidental information production section 5 acquires the header information of the one or more image files 21 from the data demultiplexing outputting section 3, the incidental information production section 5 produces incidental information to be outputted to the padding data production section 6 and the data multiplexing section 9 based on the acquired header information and the information inputted from the incidental information inputting adjustment section 4. Then, the incidental information production section 5 outputs the produced incidental information to the padding data production section 6 and the data multiplexing section 9.

The padding data production section 6 encodes the incidental information outputted from the incidental information production section 5 into an image whose significance can be discriminated readily based on a visual characteristic such as, for example, a color or a shape by a human being to produce a first encoded image. The padding data production section 6 further encodes the incidental information into an image which can be discriminated by an image analysis to produce a second encoded image. The padding data production section 6 outputs the first and second encoded images as padding data. The second encoded image may particularly be a visible symbol such as, for example, a one-dimensional barcode or a two-dimensional barcode. Or, a luminance, a shape, a color or the like may be used for encoding of the incidental information, and the amount of information which can be encoded can be increased thereby.

The padding data produced by the padding data production section 6 are sent to the image integration section 7. The image integration section 7 integrates the main images from the image inputting section 1 and the padding data from the padding data production section 6 to produce a single composite image having the aspect adjustment ratio set by the inputting from the aspect ratio adjustment inputting section 2. Alternatively, the arrangement position adjustment section for encoded images not shown may be used to adjust the position of the composite image at which the encoded image should be disposed to produce composite image data.

Figure 2:
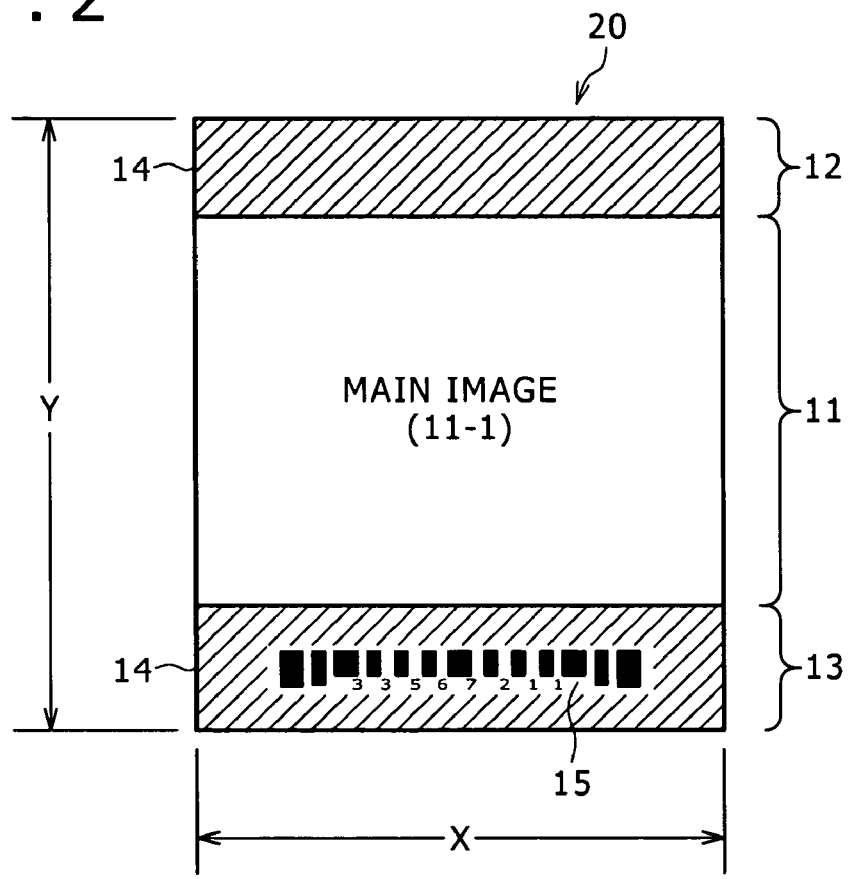
FIG. 2 is a schematic view showing an example of a composite image produced by the image processing apparatus of FIG. 1.
Figure 3:
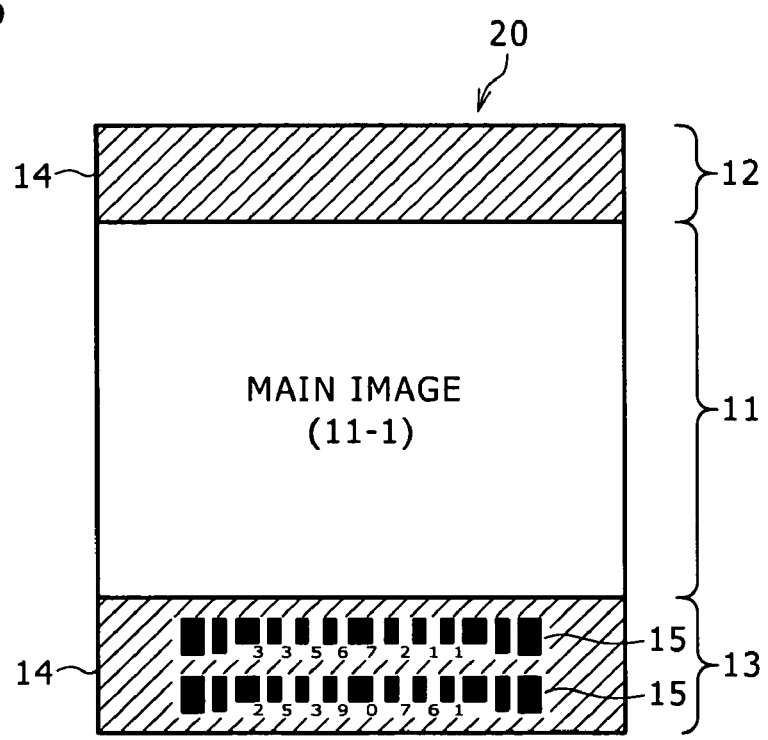
FIG. 3 is a similar view but showing a modification to padding data.

FIG. 2 shows an example of a composite image 20 produced by the image integration section 7.

Referring to FIG. 2, the composite image 20 shown is a composite image of one main image 11 (11-1) and padding data. Padding data regions 12 and 13 are provided above and below the main image 11, respectively. The longitudinal and lateral sizes of the composite image 20 are defined by an aspect adjustment ratio inputted from the aspect ratio adjustment inputting section 2. In particular, the length of the major side (in the example shown, the length in the horizontal direction) is determined as the lateral length X of the composite image 20, and the longitudinal length Y of the composite image 20 is determined from the lateral length X of the composite image 20 and the aspect adjustment ratio. In other words, the image integration section 7 variably adjusts the size of the padding data and integrates the padding data with the main image 11 so that the longitudinal and lateral sizes of the composite image may exhibit the aspect adjustment ratio designated in advance.

The position of the main image 11 with respect to the composite image 20 in the vertical direction is determined uniquely by the system, and in the example shown, it is determined that the main image 11 is disposed at a substantially mid position in the vertical direction. Accordingly, in the example shown, the padding data regions 12 and 13 are assured above and below the main image 11 in the composite image 20, respectively. It is to be noted that padding data may otherwise be assured only above or below the main image 11.

Only incidental information encoded in a first encoded image 14 is disposed in the upper padding data region 12 while incidental information encoded in the first encoded image 14 and a second encoded image 15 are disposed in the lower padding data region 13. Naturally, the incidental information encoded in the second encoded image 15 may alternatively be disposed in the upper padding data region 12 or otherwise in both of the upper and lower padding data regions 12 and 13. Or else, the incidental information encoded in the second encoded image 15 may be provided at a plurality of locations in the padding data region 12 or 13.

Figure 4:
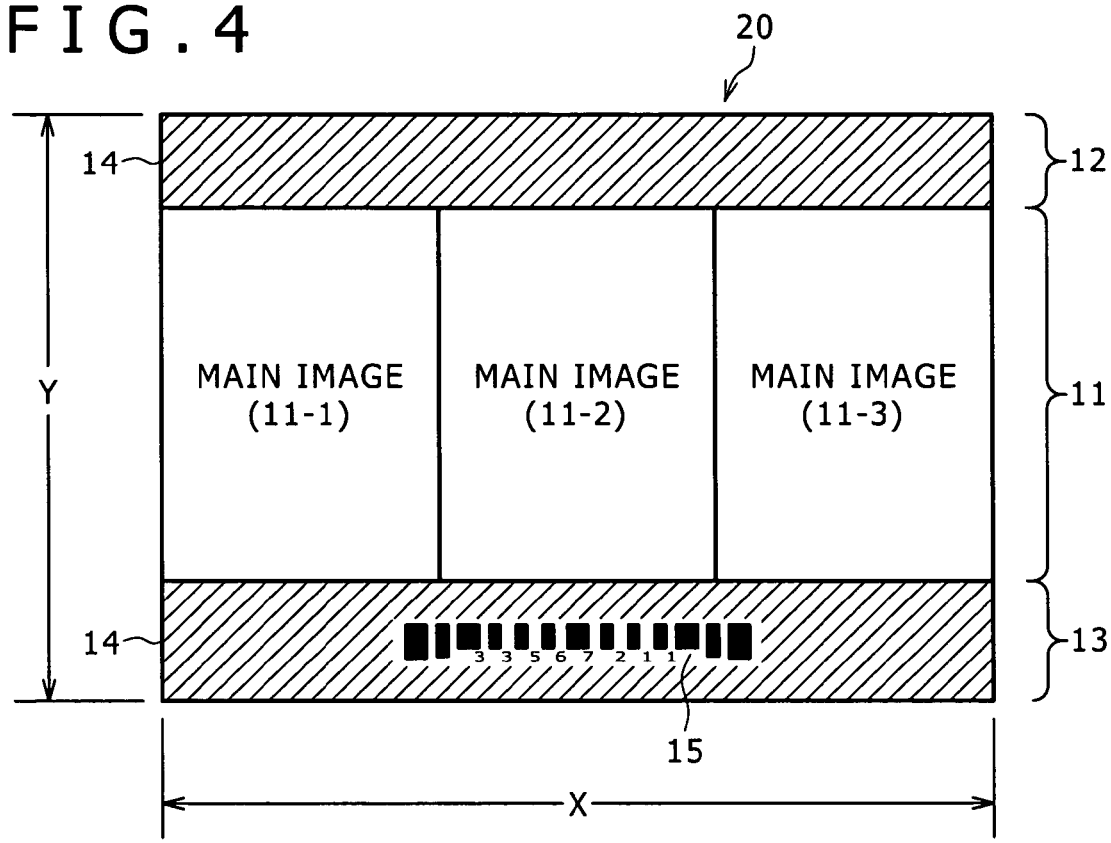
FIGS. 4 and 5 are schematic views illustrating different examples of a composite image formed from a plurality of images.

FIG. 4 shows a further example of a composite image 20.

Referring to FIG. 4, the composite image 20 shown is a composite image of three main images 11 (11-1, 11-2 and 11-3) of different image files and padding data. The three main images 11 (11-1, 11-2 and 11-3) of the different image files are juxtaposed in a mutually contacting relationship with each other in the horizontal direction so as to be integrated with each other. Padding data regions 12 and 13 are provided above and below the integrated main images 11 (11-1, 11-2 and 11-3), respectively. In the upper padding data region 12, only incidental information encoded in a first encoded image 14 is disposed. Meanwhile, in the lower padding data region 13, incidental information encoded in the first encoded image 14 and a second encoded image 15 is disposed. Also in this instance, the length of the major side (in the example shown, the length in the horizontal direction) of the integrated main images (11-1, 11-2 and 11-3) is determined as the lateral length X of the composite image 20, and the longitudinal length Y of the composite image 20 is determined from the lateral length X of the composite image 20 and the aspect adjustment ratio.

Figure 5:
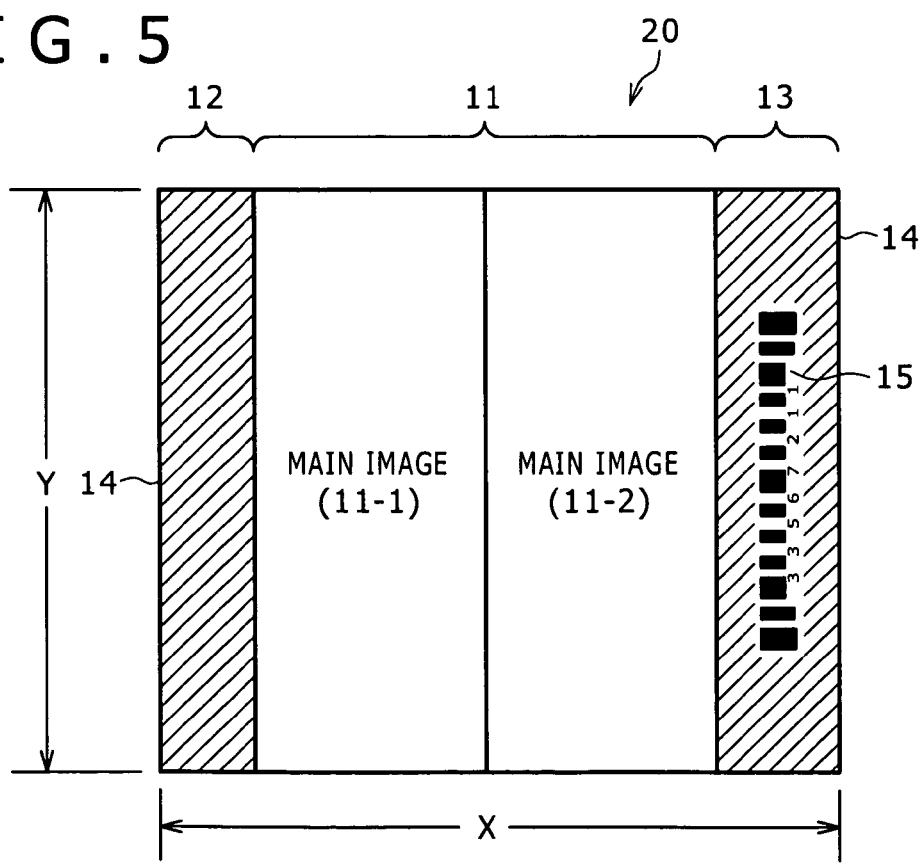

On the other hand, where main images 11 (11-1 and 11-2) have a vertically elongated shape as a whole as seen in FIG. 5, the longitudinal side of the main images 11 is a vertical side, and the length of the longitudinal side is determined as the longitudinal length Y of the composite image 20, and the lateral length X of the composite image 20 is determined from the longitudinal length Y of the composite image 20 and the aspect adjustment ratio. Accordingly, in this instance, the padding data regions 12 and 13 are set to the left and right with respect to the main images 11, and incidental information encoded in the padding data region 12 is disposed in one of the padding data regions 12 and 13, that is, in the padding data region 13.

The incidental information encoded in the first encoded image 14 and the second encoded image 15 may particularly include information relating the main images themselves such as, for example, the longitudinal and lateral sizes of the main images, information regarding the longitudinal and lateral sizes and the position of the encoded images, color space information, information regarding an image pickup method, information regarding an image pickup machine, information regarding an image pickup person and a subject, information necessary for reproduction of the main images, information effective to reproduce a plurality of images, information regarding attention upon reproduction, information regarding a recording format (information regarding a data structure, a recording mode, encoding and so forth of each image file), and so forth. It is to be noted that information regarding the size and the position of the encoded images is produced and encoded and then integrated into an encoded image by the image integration section 7.

For example, incidental information regarding a main image picked up by a digital still camera may include the date and hour of image pickup, the date and hour of digitalization, a shutter speed, a lens iris value, an exposure correction amount, a focal distance of the lens, a white balance mode (automatic/sunlight/cloudy weather/fluorescent lamp/electric bulb or the like), a scene image pickup type (standard, under water, light emission, night view, person or the like), a flash mode (automatic/compulsive light emission/inhibition or the like), a drive mode (successive image pickup or the like), a focusing mode (automatic/distance step value/infinite or the like), an image size, an image select mode (on/off), a photometry system (division photometry/central part concentration photometry/average photometry/partial photometry/spot photometry or the like, an exposure control mode (iris priority AE/shutter speed priority AE or the like), a lens focal distance, a serial number upon successive image pickup, flash light emission intensity correction, a macro image pickup mode (wide angle side macro image pickup, telephoto side macro image pickup or the like), noise reduction (on/off), an AF (Auto Focus)/AE (Auto Exposure) lock button (lock/unlock), mirror up image pickup (permission/inhibition), a shutter-iris light exposure setting step, projection of AF assisting light (on/off), a shutter speed in an AV mode (automatic/program auto/manual or the like), information (on/off, alteration-recording time number of the like) relating to AEB image pickup which is a function of recording a result of alteration of the exposure by one image pickup operation, a synchronizing timing (front diaphragm synchronizing/rear diaphragm synchronizing or the like), an AF stop function of temporarily stopping automatic focusing when the AF stop button provided at a front portion of the lens is depressed during automatic focusing operation and re-starting the automatic focusing when the button is released), automatic flash charge amount limitation (on/off), a menu button return position (top menu/preceding menu or the like), a SET button function upon image pickup (no/file storage quality alteration/ISO setting alteration/parameter selection or the like), display of superimpose (strong/standard/weak, step value and so forth), a color matrix for adjustment of the hue, positional information of the GPS (Global Positioning System) or the like, country district information, image pickup person information and so forth.

The information effective for reproduction of a plurality of images may be information for integration of a plurality of images and so forth. The information for integration of a plurality of images represents in what combination the individual images should be handled, and is used for stereoscopic display or panorama display of an image. The integration information for stereoscopic display of an image may be identification information representing that the information is an image, information of a point of view (left/right eye or image pickup point), the numbers of horizontal and vertical points of view, an overlapping degree in the horizontal direction (horizontal shift amount) or the like for each image. The integration amount for panorama display includes identification information representing that the image is a panorama image, information representing at which position (in order) the image should be positioned in the panorama, information representing an overlapping position between images, or the like.

The information regarding attention upon reproduction represents matters to which attention should be paid in appreciation such as, for example, "The room should be bright for appreciation" or "A rest should be taken" or an advice upon stereoscopic appreciation. Such information regarding attention upon reproduction is interpreted and reproduced together with main images by a reproduction apparatus.

Incidentally, since the first encoded image is an image whose significance should be discriminated based on a visual characteristic such as, for example, a color or a shape by a human being, the amount of incidental information which can be conveyed is limited. On the other hand, since the second encoded image is an image from which encoded incidental information should be discriminated by an image analysis, the amount of incidental information which can be conveyed is much greater than the first encoded image. Therefore, it is preferable to encode only incidental information which is particularly useful to a user who appreciates the images into a first encoded image and encode the other incidental information or all incidental information into the second encoded image.

Figure 6:
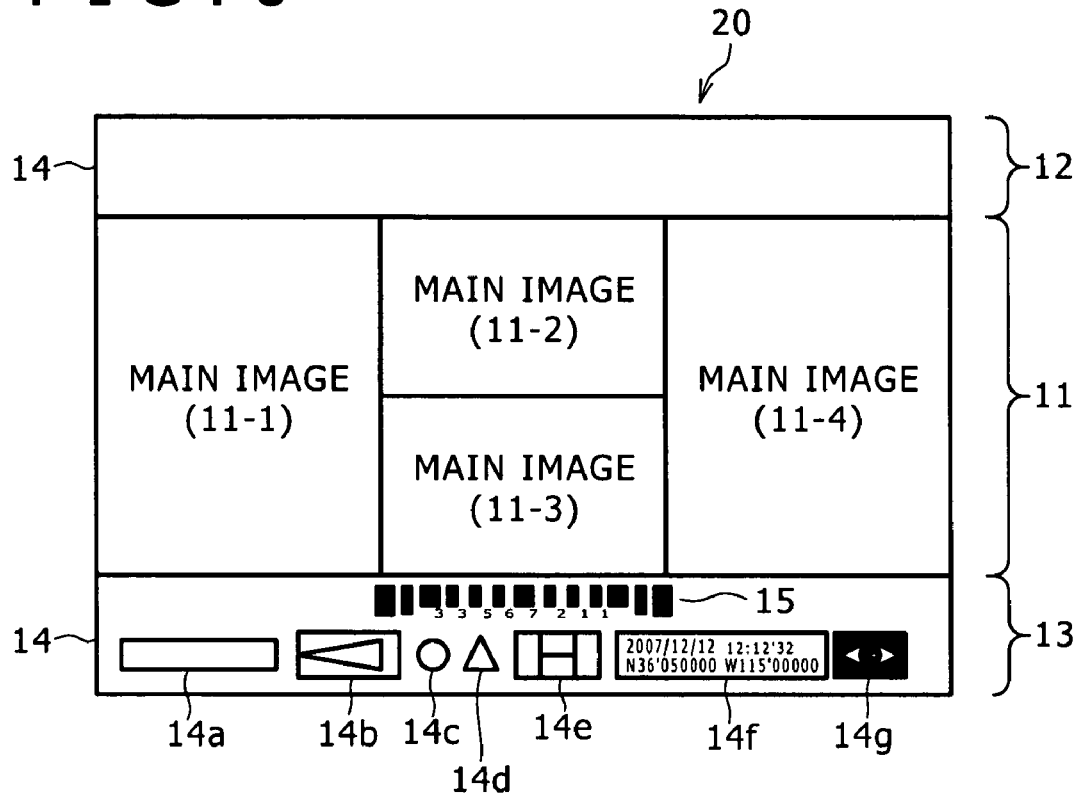
FIG. 6 is a schematic view showing an example of a composite image wherein characters or picture marks are used in a first encoded image.

A method which uses characters or picture marks in addition to a color and a shape is available as a technique for encoding a greater amount of incidental information into the first encoded image. An example of the method is illustrated in FIG. 6. Referring to FIG. 6, the composite image 20 shown includes a plurality of main images 11 (11-1, 11-2, 11-3 and 11-4) and padding data regions 12 and 13 disposed above and below the main images 11, respectively. In the lower padding data region 13, a second encoded image 15 which can be discriminated by an image analysis and a first encoded image 14 obtained by encoding incidental information using characters or picture marks are disposed. In the example shown, a zoom magnification 14a, a focal distance/angle-of-view 14b, a macro image pickup mode 14c, a flash mode 14d, configuration information 14e of a plurality of images, image pickup date and hour/position information 14f, country district information 14g and so forth are encoded in the first encoded image 14 in which characters and/or picture marks are used. Where characters or picture marks are used in the first encoded image 14 in this manner, a greater amount of incidental information can be encoded into the first encoded mage and visually conveyed to a user who appreciates the image.

Figure 7:
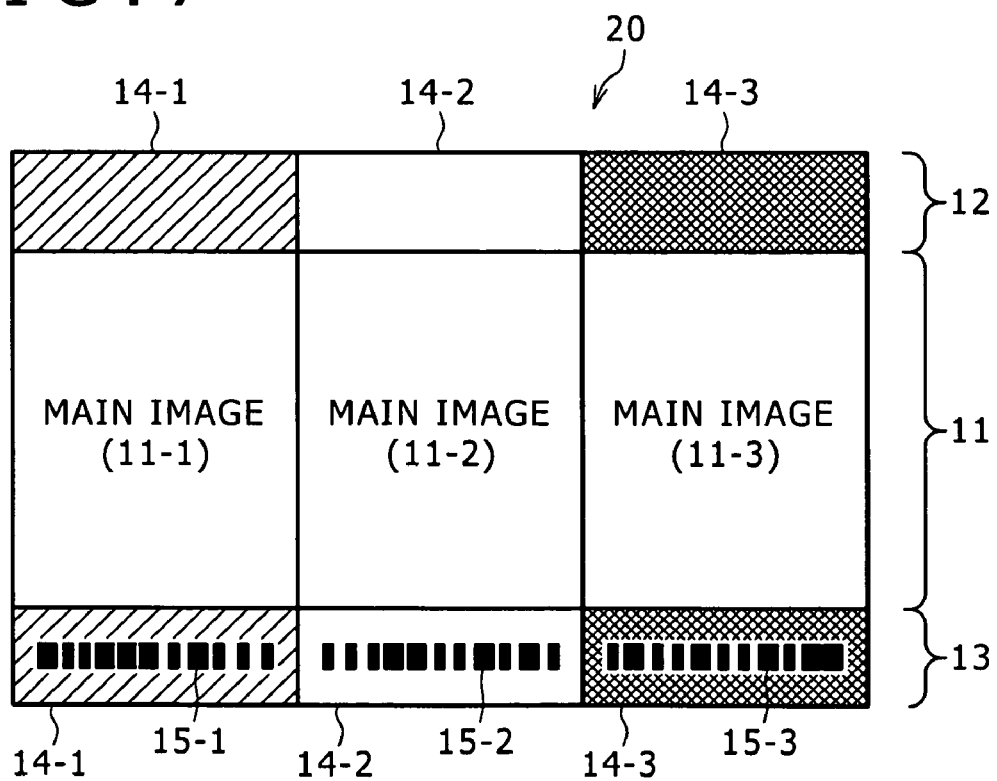
FIGS. 7 and 8 are similar views but showing different examples of a composite image wherein each main image has first and second encoded images.
Figure 8:
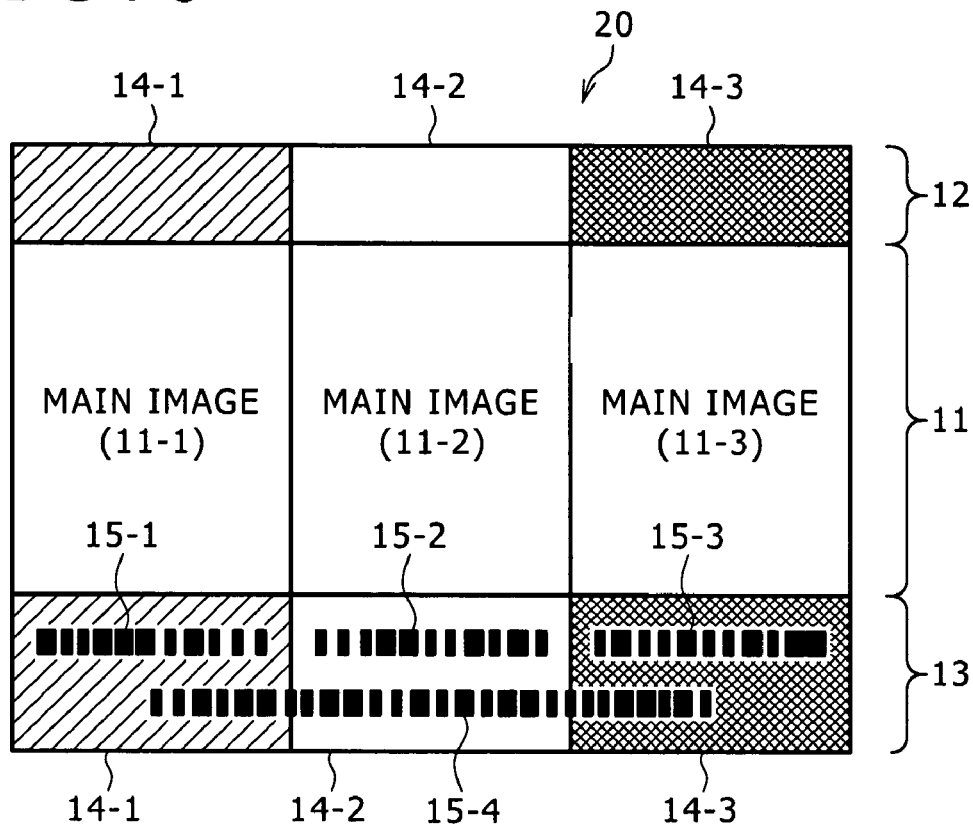

Further, in the case of a composite image which includes a plurality of images, incidental information may be encoded, for example, as seen in FIG. 7, into first encoded images 14-1, 14-2 and 14-3 whose significance can be discriminated from a visual characteristic by a human being and second encoded images 15-1, 15-2 and 15-3 whose significant can be discriminated by an image analysis, provided for the individual main images 11-1, 11-2 and 11-3. Or, for example, as seen in FIG. 8, a second encoded image 15-4 obtained by encoding the incidental information relating to the entire main image 11 may be provided together with first encoded images 14-1, 14-2 and 14-3 and second encoded images 15-1, 15-2 and 15-3 for the individual main images 11-1, 11-2 and 11-3.

This can be utilized, for example, for images formed by image pickup of the progress of medical treatment of a target area for treatment by drug dosage. In particular, picked up images of the target area for treatment are encoded into the first encoded images 14-1, 14-2 and 14-3 and the second encoded images 15-1, 15-2 and 15-3, and incidental information common to all of the images is encoded into the second encoded image 15-4. The incidental information in this instance includes, for example, information regarding drugs and dosage of the drugs, information regarding the progress of the medical treatment and so forth. The information regarding drugs and dosage of the drugs includes, for example, a drug classification (analgesic, antipruritic, convergence, anti-inflammatory or the like), an order to outside or inside, a main indication (humid tetter, dermatitis syndrome, or the like), a pharmaceutical action (anti-inflammatory action, antihistaminic action or the like), compositional and structural components, usage, a product name, the prices of the medicines, standard units and so forth. The information regarding the progress of medical treatment includes information of, for example, the dosage day, dosage, the number of elapsed days, information relating to the treated person or the like. Upon encoding of incidental information regarding individual images of a target region of treatment, there is no particular restriction with regard to selection of which incidental information should be encoded with the first encoded images 14-1, 14-2 and 14-3 and which incidental information should be encoded with the second encoded images 15-1, 15-2 and 15-3. If a kind of incidental information whose contents are desired to be recognized visually exits, then corresponding incidental information should be encoded into the first encoded images 14-1, 14-2 and 14-3 whose significance can be discriminated based on a visual characteristic thereof by a human being.

Also an application to comparison and evaluation of a plurality of images of one subject picked up varying the model of n image pickup machine or an image pickup condition is possible. For example, the model of an image pickup machine, an image pickup condition and so forth are determined as incidental information, and the incidental information is encoded into a first encoded image and a second encoded image for each image. Also in this instance, incidental information useful to a user who compares and evaluates images should be encoded into first encoded images 14-1, 14-2 and 14-3 whose significance can be discriminated based on a visual characteristic by a human being.

Figure 9:
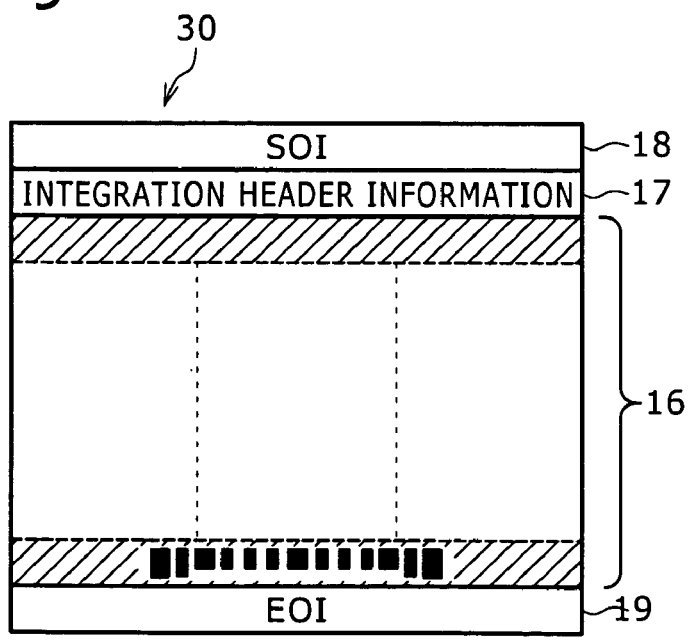
FIG. 9 is a schematic view showing a configuration of an image file outputted from the image processing apparatus of FIG. 1.

Composite image data obtained by the image integration section 7 in such a manner as described above is compression encoded in accordance with a predetermined system such as, for example, the JPEG system by the image encoding section 8 and sent to the data multiplexing section 9. Then, the substance of the incidental information outputted from the incidental information production section 5 is multiplexed as integrated header information with the compression encoded composite image data to produce an image file. A configuration of the image file 30 is shown in FIG. 9. As seen in FIG. 9, the image file 30 shown includes compression encoded composite image data 16, integration header information 17, an SOI 18 indicative of the top of the file, an EOI 19 indicative of the last of the file, and so forth. Image information of a plurality of images and incidental information are recorded as an integrated image together with the compression encoded composite image data. The image file 30 produced in this manner is recorded on or into a computer-readable recording medium by the recording medium writing section 10.

With the image processing apparatus 100 having the configuration described above, a composite image wherein part of incidental information relating to a main image can be visually conveyed to a person who appreciates the main image.

Further, with the image processing apparatus 100 of the present embodiment, a composite image which can convey incidental information relating to a main image to a reproduction apparatus which reproduces the main image without depending upon header information. For example, where the incidental information is information necessary to display a plurality of images, a reproduction apparatus can integrate the plural images to perform stereoscopic display or panorama display without depending upon any header information.

Further, with the image processing apparatus 100 of the present embodiment, a composite image from which integration header information of the image file 30 can be restored and obtained.

Furthermore, a composite image of a main image and padding data obtained by the image processing apparatus 100 of the present embodiment can be printed such that it is entirely held just in a print paper because it has an aspect ratio determined in accordance with the aspect ratio of a print paper sheet to be used.

Figure 10:
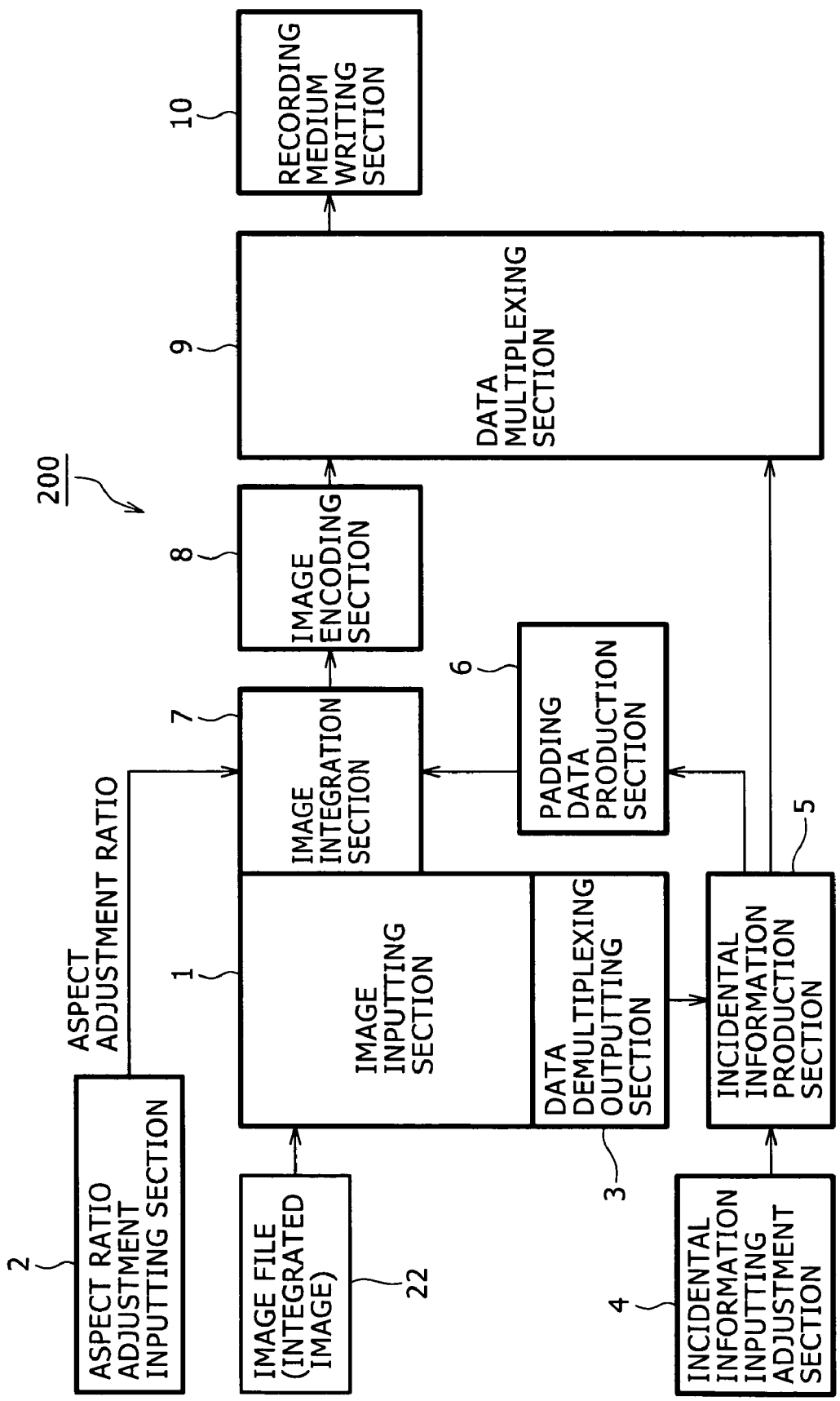
FIG. 10 is a block diagram showing a modification to the image processing apparatus of FIG. 1.

It is to be noted that, in the embodiment described above, one or more image files each having header information are inputted, and a composite image of main images of the image files and padding data produced from the header information and so forth is produced. However, as shown in FIG. 10, an image file 22 which includes a plurality of main images integrated together and to which incidental information regarding the integrated image is added as integration header information may be inputted to produce a composite image of the integrated image and padding data produced from the integration header information.

Further, in the foregoing description, operations from inputting of a file of a main image to outputting of a file of a composite image are performed every time a file of a main image is inputted. However, it is otherwise possible to store, if incidental information regarding a main image inputted is determined finally, the incidental information into the inside of the image processing apparatus 200 of FIG. 10 and then perform, after incidental information regarding all main images to be processed is determined finally, production of padding data, image integration, compression encoding, multiplexing with header information and writing on or into a recording medium. Or, incidental information stored after finally determined once may be read out again and displayed such that it is re-edited.

Now, modifications to the second encoded image 15 which can be discriminated by an image analysis are described.

In the embodiment described above, a one-dimensional barcode, a two-dimensional barcode or the like is used for the second encoded image 15 which can be discriminated by an image analysis. However, a luminance, a shape, a color or the like may be adopted additionally or alternatively for encoding of information. This can increase the amount of information which can be encoded.

Figure 11:
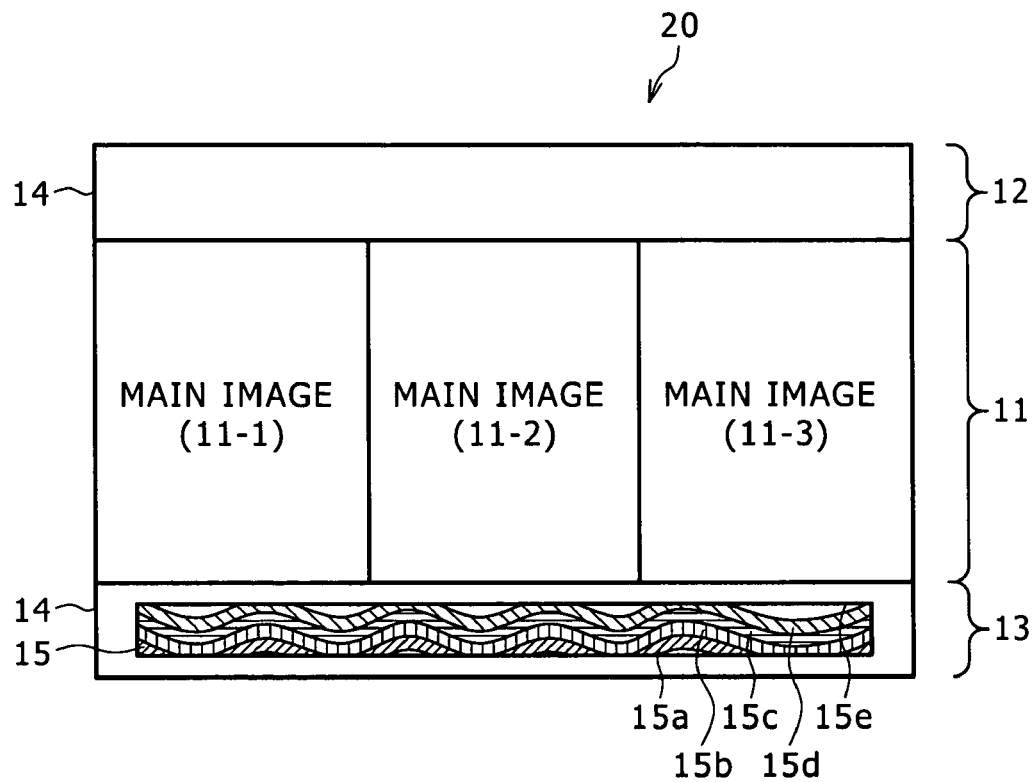
FIGS. 11 and 12 are schematic views showing different modifications to a second encoding image which can be discriminated by an image analysis.
Figure 12:
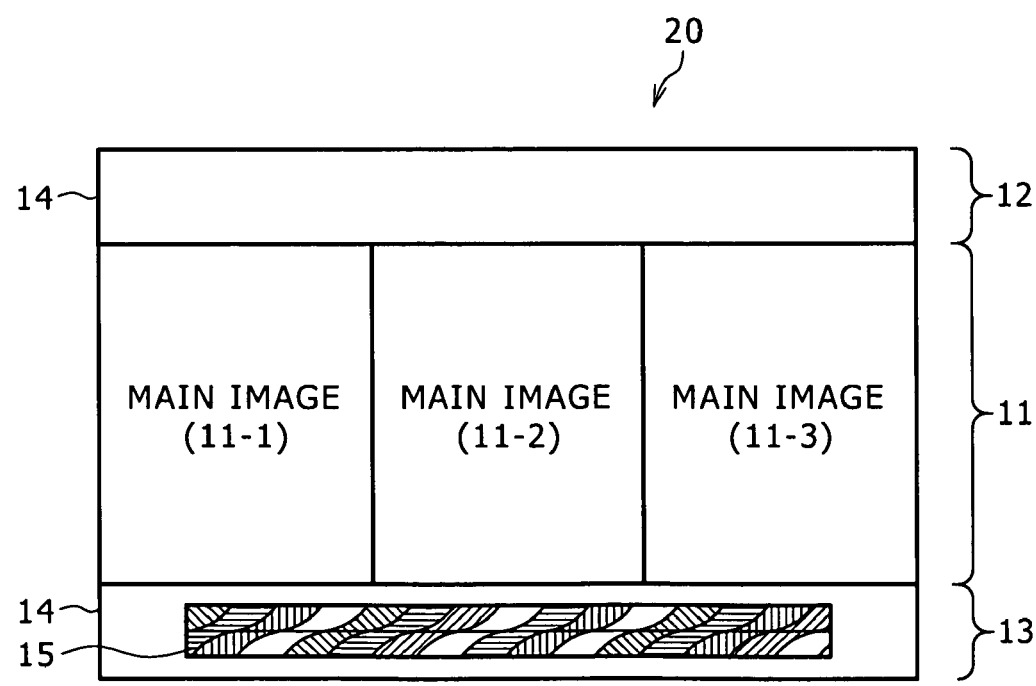

Particular examples are shown in FIGS. 11 and 12. In the examples shown, a curved line is used as a factor of the second encoded image 15. In particular, in FIG. 11, several curves do not cross with any other curve and have a difference in characteristic from those of the example of FIG. 12. Naturally, the curved lines are mere examples, and various other characteristics such as a shape of a line (straight line/curved line), the direction of a line, the number of crossing points with other lines, the line width and the number of curves of a line can be used for encoding. Further, in the encoded image of FIG. 11, regions 15a, 15b, 15c, 15d and 15e of the individual curved line portions are colored in different colors, and incidental information may be encoded depending upon the combination of colors, the number of colors, the positions of individual colors and so forth.

Now, an image processing apparatus which displays and reproduces, from an image file 30 which does not include integration header information because of break, loss or the like thereof, a plurality of images in an integrated manner is described as a second embodiment of the present invention.

Figure 13:
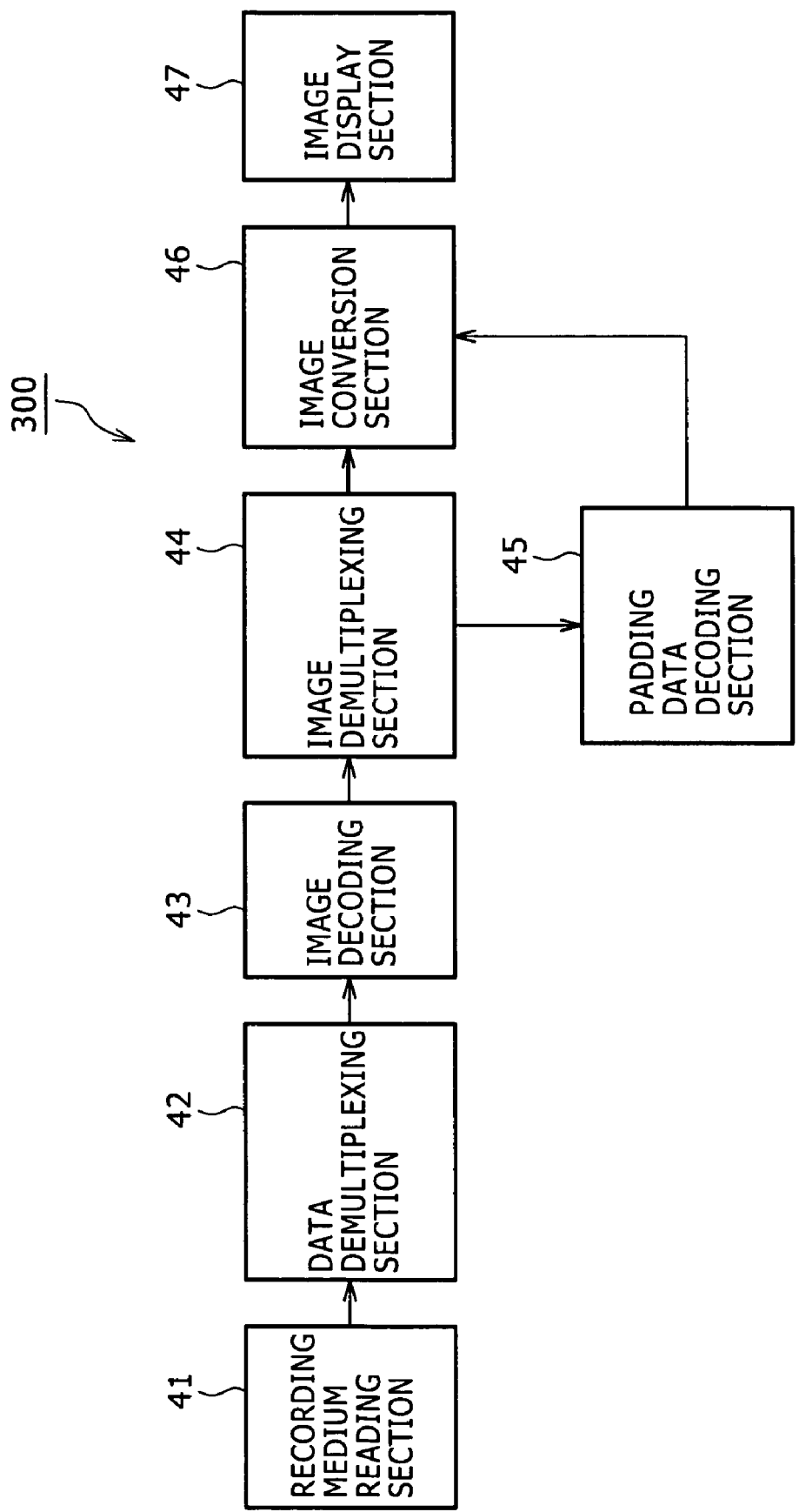
FIGS. 13 to 15 are block diagrams each showing a configuration of a different image reproduction apparatus to which embodiments if the present invention are applied.

FIG. 13 shows a configuration of the image reproduction apparatus of the present embodiment.

Referring to FIG. 13, the image reproduction apparatus 300 shown includes a recording medium reading section 41, a data demultiplexing section 42, an image decoding section 43, an image demultiplexing section 44, a padding data decoding section 45, an image conversion section 46, and an image display section 47.

The recording medium reading section 41 reads in, from a removable recording medium, an image file 30 (FIG. 9) which includes a composite image of a plurality of main images and padding data (first and second encoded images) obtained by encoding incidental information necessary for integration of the main images.

The data demultiplexing section 42 demultiplexes and extracts compression encoded composite image data 16 (FIG. 9) from the image file 30 read in from the recording medium.

The image decoding section 43 decodes the compression encoded composite image data 16 demultiplexed and extracted by the data demultiplexing section 42.

The image demultiplexing section 44 demultiplexes the main images and the padding data (first and second encoded images) from the decoded composite image data and distributes the main images and the padding data to the image conversion section 46 and the padding data decoding section 45, respectively.

The padding data decoding section 45 discriminates and decoded the first and second encoded images in the padding data by color discrimination, luminance discrimination, pattern recognition and so forth to reproduce incidental information necessary for integration of the images.

The image conversion section 46 executes an arithmetic operation process for integration of the images such as stereoscopic display or panorama display for the main images based on the decoded incidental information. The image conversion section 46 outputs a result of the arithmetic operation process to the image display section 47.

The image display section 47 displays the integrated image.

Now, operation of the image reproduction apparatus 300 is described.

In an ordinary reproduction apparatus, integration reproduction of a plurality of images is performed based on header information of the image file 30. However, in the image reproduction apparatus 300 of the present embodiment, integration reproduction of a plurality of images is performed based on incidental information encoded in padding data (first and second encoded images).

First, the recording medium reading section 41 reads in, from a removable recording medium, an image file 30 (FIG. 9) including a plurality of main images and padding data (first and second encoded images) obtained by encoding incidental information necessary for integration of the main images. Then, the data demultiplexing section 42 demultiplexes and extracts compression encoded composite image data 16 from the image file 30 read in from the recording medium, and the image decoding section 43 decodes the extracted composite image data 16.

Then, the image demultiplexing section 44 demultiplexes the main images and the padding data from the decoded composite image data, and outputs the main images to the image conversion section 46. Meanwhile, the padding data are outputted to the padding data decoding section 45, by which the incidental information necessary for integration of the images is decoded. Then, the image conversion section 46 performs an arithmetic operation process for integration such as stereoscopic display or panorama display for the main images based on the decoded incidental information. A result of the arithmetic operation process is displayed on the image display section 47.

In this manner, with the image reproduction apparatus 300 of the present embodiment, integrated reproduction of a plurality of images can be performed based on incidental information encoded in padding data (first and second encoded images).

Now, an image reproduction apparatus which uses an image fetching apparatus according to a third embodiment of the present invention is described.

Figure 14:
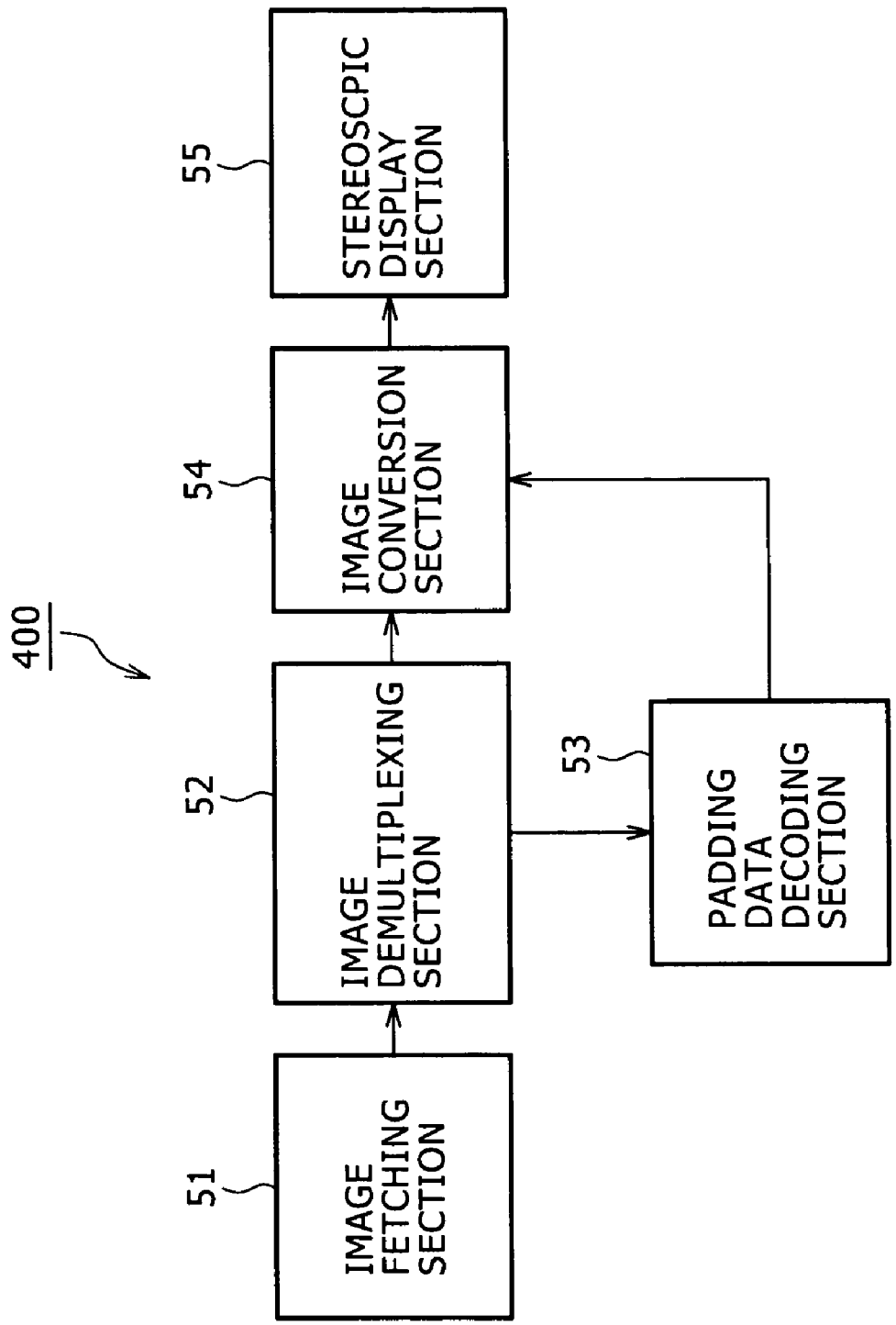

FIG. 14 shows a configuration of an information reproduction apparatus 400 which uses an image fetching apparatus. Referring to FIG. 14, the information reproduction apparatus 400 includes an image fetching section 51 for reading in, from an image sheet on which a composite image obtained using the image processing apparatus 100 of FIG. 1 is printed, the composite image using an optical system. The information reproduction apparatus 400 further includes an image demultiplexing section 52 for demultiplexing main images and padding data from the composite image read in by the image fetching section 51. The information reproduction apparatus 400 further includes a padding data decoding section 53 for discriminating and decoding the padding data by color discrimination, luminance discrimination, pattern recognition and so forth to restore the incidental information. The information reproduction apparatus 400 further includes an image conversion section 54 for executing, based on the decoded incidental data, an arithmetic operation process for integration such as visualization, stereoscopic display, panorama display or the like for the main images. The information reproduction apparatus 400 further includes an image display section 55 for displaying the integrated image.

Integration reproduction of a plurality of images such as visualization of incidental information, stereoscopic display, panorama display or the like from a printed matter of a composite image can be performed by the information reproduction apparatus 400 having such a configuration as described above.

Now, an image processing apparatus which includes an image pickup apparatus according to a fourth embodiment of the present invention is described.

Figure 15:
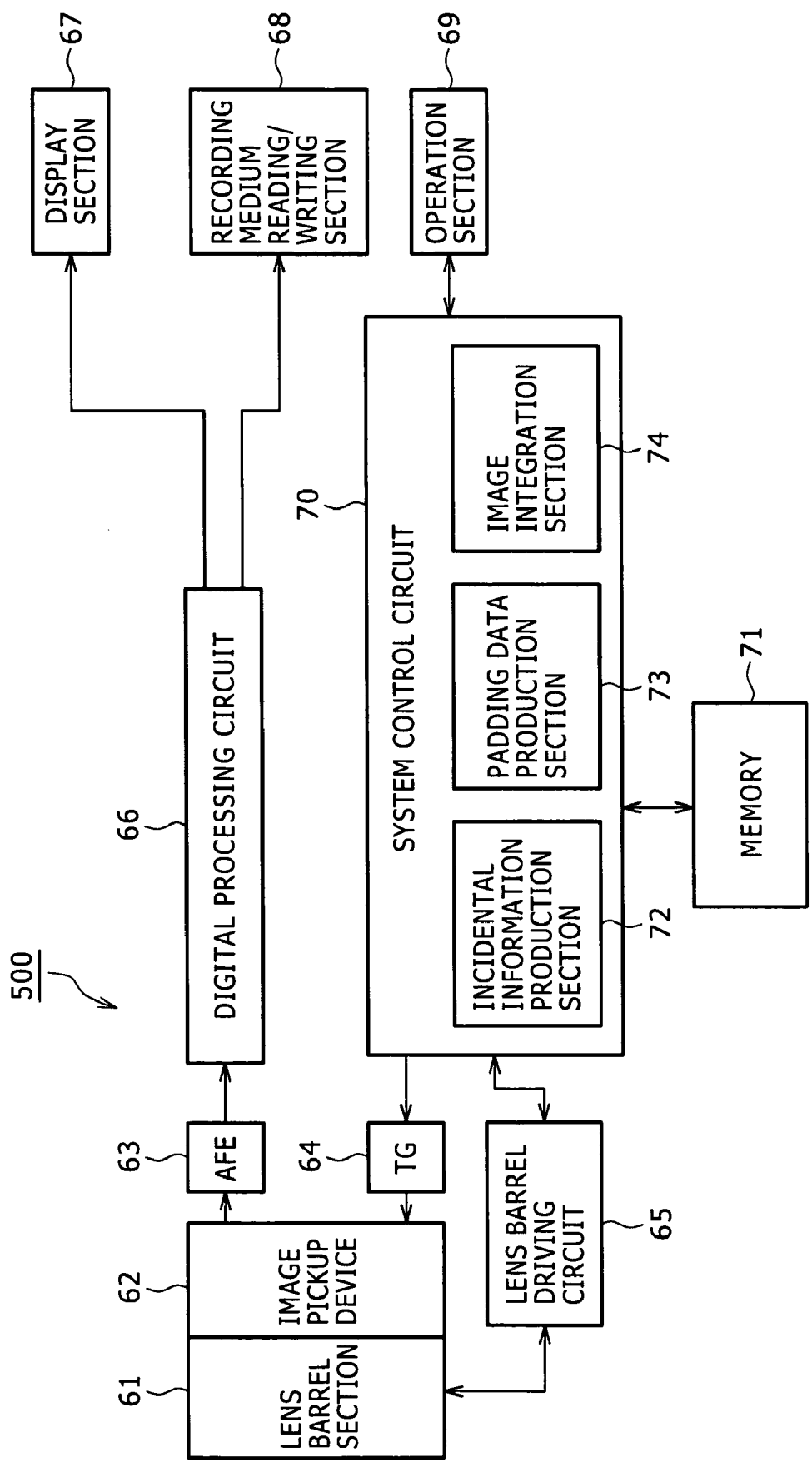

FIG. 15 shows a configuration of an information processing apparatus 500 which includes an image pickup system.

Referring to FIG. 15, the information processing apparatus 500 includes an image pickup system including a lens barrel section 61 and an image pickup device 62, and an AFE (Analog Front End) analog signal processing circuit 63 for reading an output of the image pickup device 62. The information processing apparatus 500 further includes a timing generator (TG) 64 for driving the image pickup device 62, and a lens barrel driving circuit 65 for driving the lens barrel section 61. The information processing apparatus 500 further includes a digital processing circuit 66 for processing an output of the image pickup device 62, a display unit 67, and a recording medium reading/writing section 68 for performing reading and reproduction of a recording medium. The information processing apparatus 500 further includes an operation section 69, a system control circuit 70, and a memory 71. The system control circuit 70 includes an incidental information production section 72, a padding data production section 73, and an image integration section 74.

An output of the image pickup device 62 is read by the AFE analog signal processing circuit 63 and outputted to the digital processing circuit 66. The digital processing circuit 66 produces digital data of an image from the output of the image pickup device 62. The system control circuit 70 cumulatively stores the image data produced by the digital processing circuit 66 into the memory 71. The memory 71 retains data of successively picked up images.

If an instruction for integration of images from a user is inputted from the operation section 69, then the system control circuit 70 displays a table of the images retained in the memory 71 on the display unit 67 in order to allow the user to select an image of an object of integration. After an image of an integration object is selected, the system control circuit 70 urges the user to input information for integration through the display unit 67. If information for integration is inputted from the operation section 69, then the system control circuit 70 retains the information into the memory 71.

Thereafter, if an instruction to execute integration of images from the user is issued from the operation section 69, then the system control circuit 70 receives the instruction and starts integration of the selected image data and padding data.

The system control circuit 70 performs production of incidental information by means of the incidental information production section 72 based on the information for integration retained in the memory 71. Then, the system control circuit 70 produces padding data based on the incidental information by means of the padding data production section 73. Then, the system control circuit 70 integrates the padding data with the selected image data by means of the image integration section 74 and records the composite data on or into a recording medium through the digital processing circuit 66 and the recording medium reading/writing section 68.

Consequently, a composite image of the main images picked up by the image pickup system, the first encoded image obtained by encoding incidental information regarding the main images based on a visual characteristic such as the color, shape or the like and the second encoded image of a form in which the incidental information can be discriminated by an image analysis can be obtained.

Now, applications of the embodiments of the present invention are described.

Figure 16:
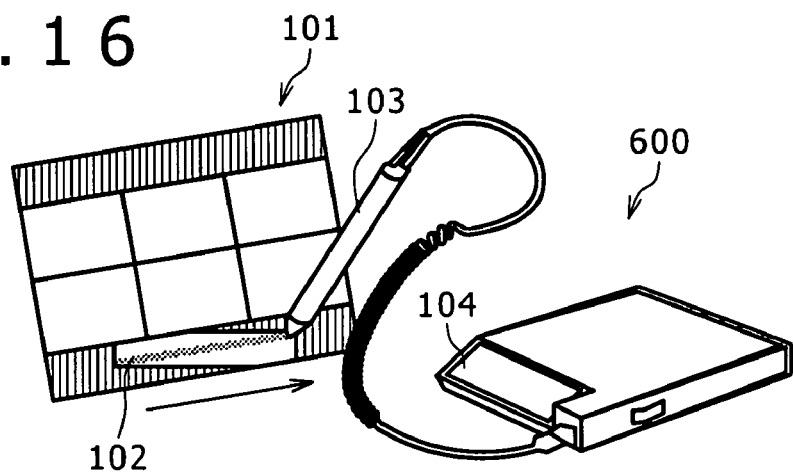
FIG. 16 is a schematic perspective view showing a padding data reading apparatus which is an application of the image processing apparatus and image reproduction apparatus of the present invention.
Figure 17:
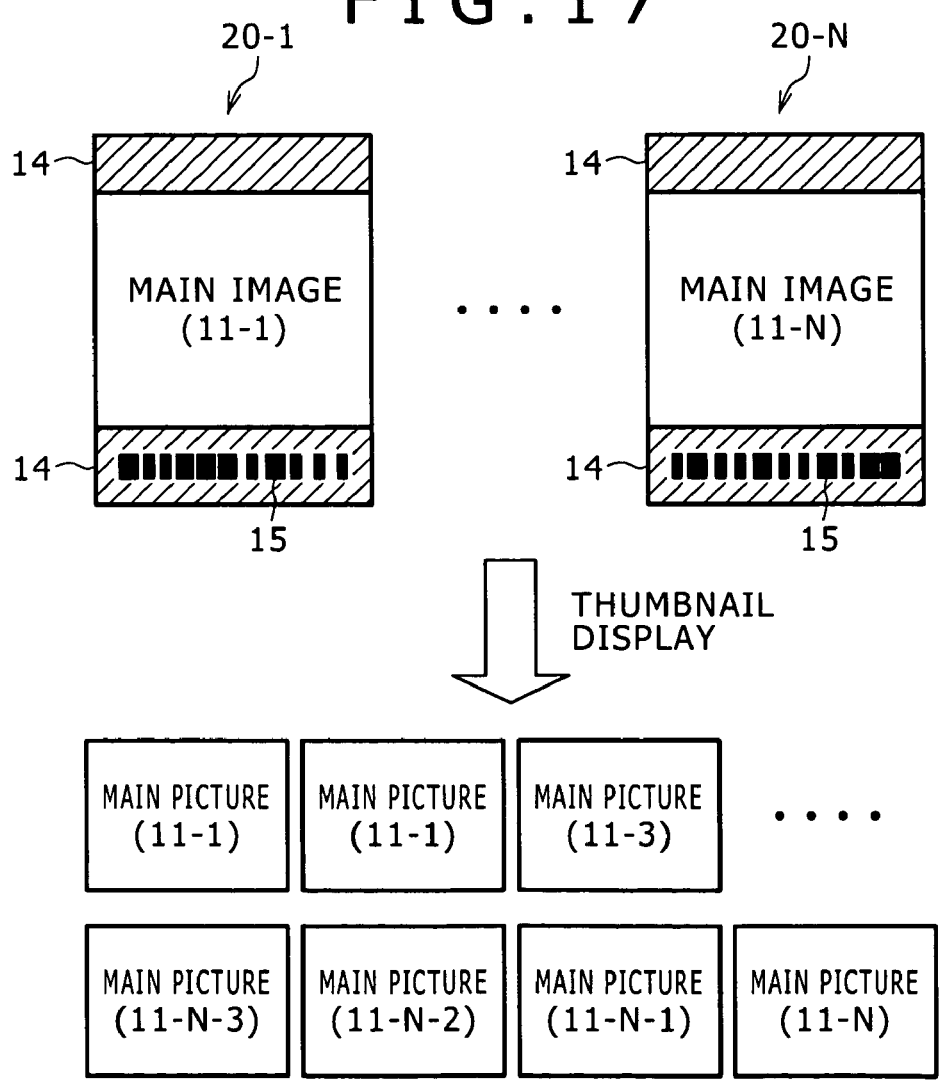
FIG. 17 is a schematic view illustrating a thumbnail image displaying function of a main image.
Figure 18:
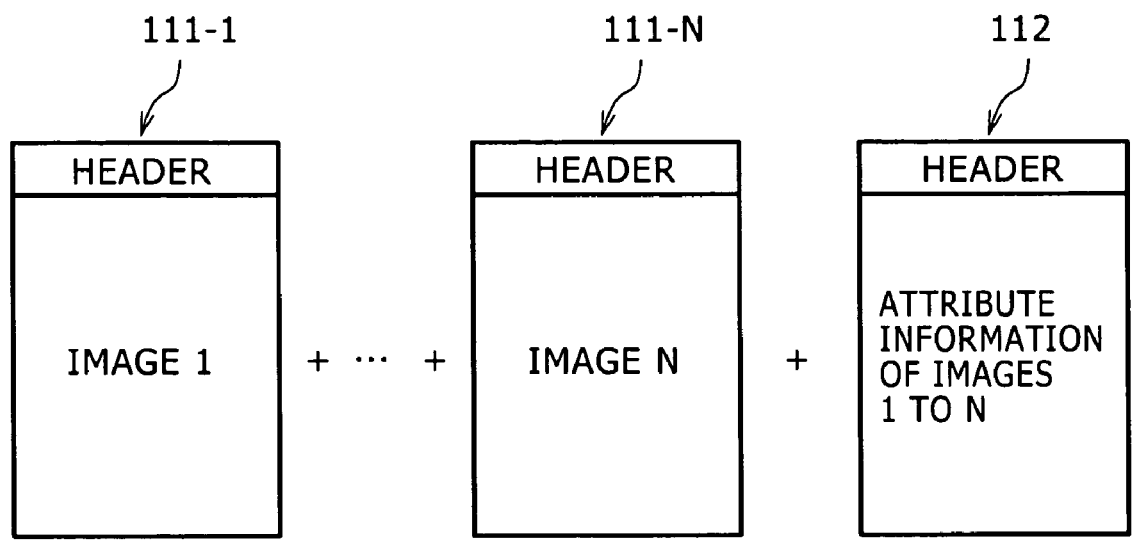
FIG. 18 is a schematic view illustrating a method of integrating a plurality of images.
Figure 19:
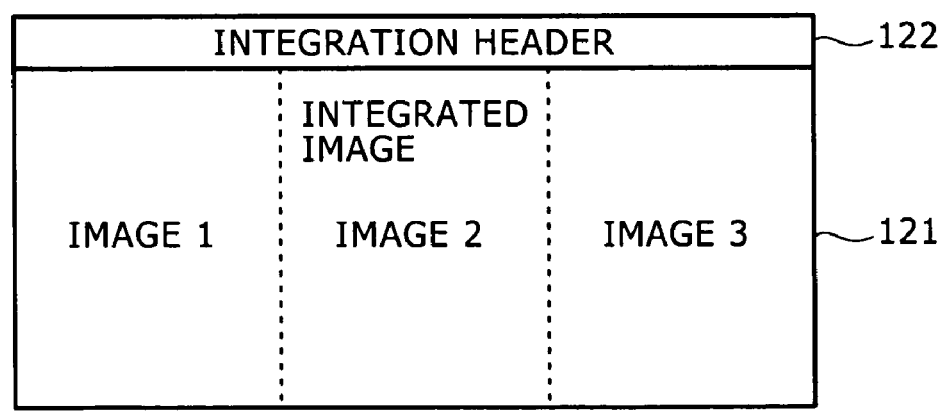
FIG. 19 is a schematic view illustrating a method of integrating a plurality of images using integration header information.
Figure 20:
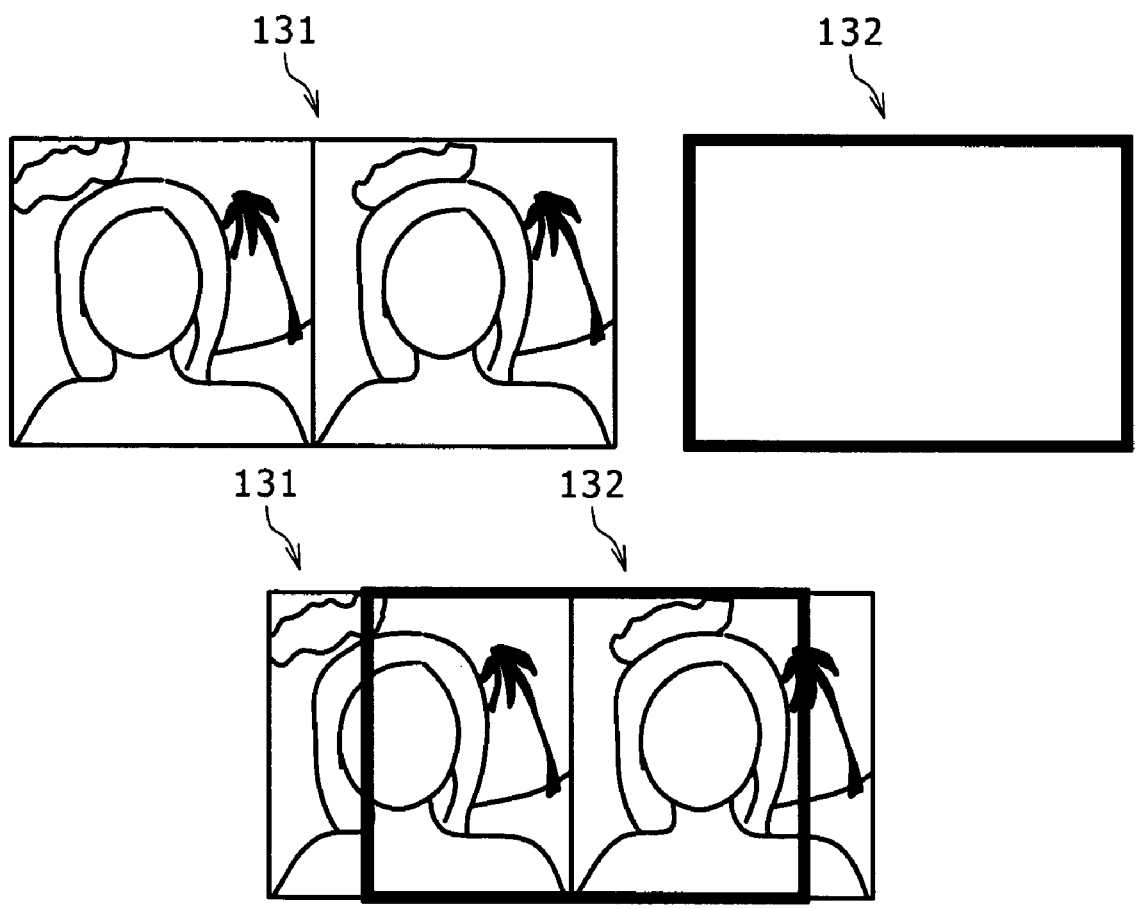
FIG. 20 is a schematic view illustrating a problem upon printing of an image.

FIG. 16 shows a padding data reading apparatus 600 which includes an optical reading apparatus 103 having a pen-like shape for reading in an encoded image 102 in a region for padding data of an image sheet 101 which is a printed matter of a composite image produced by the image processing apparatus 100 of the embodiment described hereinabove with reference to FIG. 1. The padding data reading apparatus 600 further includes a padding data decoding section not shown for decoding the encoded image 102 to obtain incidental data relating to images, and a display unit 104 for displaying the resulting incidental information in the form of characters.

The application described above may be modified such that information for integration of images as well as information of the image pickup date and hour, an image pickup place, an image picking up person, a title and so forth may be recorded as the encoded image 102 in the region for padding data.

It is to be noted that, in the embodiments of the present invention, it is not essential to form padding data from both of information encoded based on a visual characteristic such as a color or a shape which can be recognized at a glance by a human being and information represented using a visual symbol such as, for example, a one-dimensional barcode or a two-dimensional barcode. In other words, padding data may be formed from encoded information of one of the encoded information and the information represented by a visual symbol.

Further, the image reproduction apparatus 300 shown in FIG. 13 may have an additional function, that is, a function of reducing the main images 11-1, . . . , 11-N of a plurality of composite images 20-1, . . . , 20-N so that they may be displayed in a table (thumbnail display). When this function is to be utilized, a sorting condition or a display condition for display of each main image is selected in advance by a user. Here, for the sorting condition or the display condition, it is possible to utilize incidental information obtained by decoding from an encoded image demultiplexed and extracted from a composite image. For example, in the case of incidental information relating to an image picked up by a digital camera, the "image pickup date and hour" is designated as the sorting condition and the "scene image pickup type=night view" is designated as the display condition so that all images whose scene image pickup type is a night view may be displayed as thumbnail images in the order of image pickup date and hour. Or else, manual sorting and comparison may be performed through comparison and visual recognition of encoded image portions without performing automatic sorting. Or, upon display, the integration header or incidental information obtained from encoded images may be utilized such that only main image portions are displayed.

In the following, operation where this function is utilized is described. If the image reproduction apparatus 300 receives an instruction for thumbnail image display from a user, then the recording medium reading section 41 reads in image files 30 from a removable recording medium. Further, the data demultiplexing section 42 separates and extracts composite images 20-1, . . . , 20-N of main images 11-1, . . . , 11-N and padding data (incidental information encoded in the first encoded image 14 and incidental information encoded in the second encoded image 15). The main images 11-1, . . . , 11-N are decoded by the image decoding section 43 while the padding data are decoded by the padding data decoding section 45 to restore the incidental information. After the main images 11-1, . . . , 11-N and the corresponding incidental information of all of the image files 30 recorded on or in the recording medium are obtained, the image conversion section 46 decides those main images which satisfy the designated display condition based on the incidental information. Then, the image conversion section 46 determines an order of arrangement in display of all of the pertaining main images based on the designated sorting condition and displays the main images on the image display section 47.

The embodiments of the present invention can be applied also where a plurality of images are mapped and displayed in a coordinate space based on the position information added as the incidental information to the individual main images.

Further, the function for image processing and image reproduction of the image processing apparatus 100, image reproduction apparatus 300 and information reproduction apparatus 400 described above as the embodiments of the present invention may be provided as a program for causing a computer such as a PC (personal computer) to execute the function.

While preferred embodiments of the present invention have been described using specific terms, such description is for illustrative purpose only, and it is to be understood that changes and variations may be made without departing from the spirit or scope of the following claims.

What is claimed is:

1. An image processing apparatus, comprising:
   an image inputting electronic processing section for inputting image information for a plurality of images;
   an encoding electronic processing section for encoding incidental information relating to input main image or images into image data, and further wherein the encoded incidental information image data is in a form that may be directly transformed back into the incidental information; and an image integration electronic processing section for integrating the inputted main image or images and the encoded image data obtained by said encoding section so as to be displayed in respective regions of a display screen, wherein at least some of the image data has an aspect ratio that is adjusted for image integration, and further wherein aspect ratio adjustment data is utilized for image integration processing and further wherein an image arrangement position adjusting mechanism automatically adjusts a relative position of the plurality of images and the image integration processing section varies a size of the encoded image that is integrated with the main image data so that both longitudinal and lateral sizes of the composite image exhibit a predetermined aspect ratio and a luminance, shape or color of the encoded image define additional information.

2. The image processing apparatus according to claim 1, wherein said encoding electronic processing section encodes the incidental information into image data which can be discriminated based on a visual characteristic.

3. The image processing apparatus according to claim 1, wherein said encoding electronic processing section encodes the incidental information into image data which can be discriminated by a visual analysis.

4. The image processing apparatus according to claim 1, wherein said encoding electronic processing section encodes the incidental information into first encoded image data which can be discriminated based on a visual characteristic and a second encoded image data which can be discriminated by an image analysis.

5. The image processing apparatus according to claim 3, wherein the image data which can be discriminated by image analysis is a barcode.

6. The image processing apparatus according to claim 1, further comprising:
  means for compression encoding the composite image obtained by said image integration electronic processing section; and
  a multiplexing electronic processing section for adding the substance of the incidental information as header information to the composite image compression encoded by said encoding section to produce structured image information.

7. An image processing method executed by a system that is controlled by a microprocessor, comprising:
  automatically transferring into the system information of one or more images as a main image or images;
  encoding incidental information relating to the inputted main image or images into image data, and further, wherein the encoded incidental information image data is in a form that may be directly translated back into the incidental information; and
  integrating the inputted main image or images and the encoded image data obtained by the encoding processing so as to be displayed in respective regions of a display screen, wherein at least some of the image data has an aspect ratio that is adjusted for image integration, and further wherein aspect ratio adjustment data is utilized for image integration processing in order to provide integrated output image data and further wherein an image arrangement position adjusting mechanism automatically adjusts a relative position of the plurality of images and the image integration processing section varies a size of the encoded image that is integrated with the main image data so that both longitudinal and lateral sizes of the composite image exhibit a predetermined aspect ratio and a luminance, shape or color of the encoded image define additional information.

8. An image processing apparatus, comprising:
a composite image inputting electronic processing section for inputting a composite image formed by integrating one or more main images and encoded image data obtained by encoding incidental information relating to the main image or images so as to be displayed in respective regions of a display screen, wherein at least some of the image data has an aspect ratio that is adjusted for image integration, and further wherein aspect ratio adjustment data is utilized for image integration processing and further wherein an image arrangement position adjusting mechanism automatically adjusts a relative position of the plurality of images;
a demultiplexing electronic processing section for demultiplexing the main image or images and the encoded image data from the inputted composite image;
a decoding electronic processing section for decoding the encoded image demultiplexed by said demultiplexing electronic processing section to reproduce incidental information, and further wherein the image data is in a form that is directly translated back into the incidental information; and
a restoration electronic processing section for producing header information based on the incidental information decoded by said decoding section and adding the header information to the main image or images to restore structured image information and both longitudinal and lateral sizes of the composite image exhibit a predetermined aspect ratio and a luminance, shape or color of the encoded image define additional information.

9. An image processing method executed by a system that is controlled by a microprocessor, comprising:
  automatically transferring into the system a composite image formed by integrating one or more main images and an encoded image obtained by encoding incidental information relating to the main image or images so as to be displayed in compartmentalized respective regions of a display screen, wherein at least some of the image data has an aspect ratio that is adjusted for image integration, and further wherein aspect ratio adjustment data is utilized for image integration processing and further wherein an image arrangement position adjusting mechanism automatically adjusts a relative position of the plurality of images;
  demultiplexing the main image or images and the encoded image from the inputted composite image;
  decoding the encoded image demultiplexed by the demultiplexing step to reproduce incidental information, and further wherein the encoded incidental information image data is in a form that may be directly translated back into the incidental information; and
  producing header information based on the incidental information decoded by the process at the decoding step and adding the header information to the main image or images to restore structured image information in order to provide output image information and the image integration processing section varies a size of the encoded image that is integrated with the main image data so that both longitudinal and lateral sizes of the composite image exhibit a predetermined aspect ratio and a luminance, shape or color of the encoded image define additional information.

10. An image reproduction apparatus, comprising:
a composite image inputting electronic processing section for inputting a composite image formed by integrating one or more main images and an encoded image obtained by encoding incidental information relating to the main image or images so as to be displayed in respective regions of a display screen, wherein at least some of the image data has an aspect ratio that is adjusted for image integration, and further wherein aspect ratio adjustment data is utilized for image integration processing and further wherein an image arrangement position adjusting mechanism automatically adjusts a relative position of the plurality of images;

a demultiplexing electronic processing section for demultiplexing the main image or images and the encoded image from the inputted composite image;

a decoding electronic processing section for decoding the encoded image demultiplexed by said demultiplexing section to reproduce incidental information, and further wherein the encoded incidental information image data is directly translated back into data that is defined by the encoded image data; and an image conversion electronic processing section for reproducing the one or more main images demultiplexed by said demultiplexing electronic processing section based on the incidental information decoded by said decoding section and the image integration processing section varies a size of the encoded image that is integrated with the main image data so that both longitudinal and lateral sizes of the composite image exhibit a predetermined aspect ratio and a luminance, shape or color of the encoded image define additional information.

11. The image reproduction apparatus according to claim 10, further comprising a display condition selection electronic processing section for selecting a condition of those main images which are to be displayed in a table, and wherein said image conversion electronic processing section decides, when an instruction for table display is received, those main images which satisfy the condition selected by said display condition selection electronic processing section based on the decoded incidental information and performs a process for causing all of the decided main images to be displayed in a table.

12. The image reproduction apparatus according to claim 10, further comprising:

a display condition selection electronic processing section for selecting a condition of those images which are to be displayed in a table; and a sorting condition selection electronic processing section for selecting a sorting condition for display of the main images;

said image conversion electronic processing section being operable, when an instruction for table display is received, to decide those main images which satisfy the condition selected by said display condition selection electronic processing section and determine an arrangement order in display of all of the decided main images based on the sorting condition selected by said sorting condition selection section to perform a process for displaying the main images in a table.

13. An image reproduction method executed by a system that is controlled by a microprocessor which maintains underlying incidental image information pertaining to one or more main images which is encoded as image data in a composite image comprising:

inputting a composite image formed by integrating one or more main images and encoded image data obtained by encoding incidental information relating to the main image or images, wherein at least some of the image data has an aspect ratio that is adjusted for image integration, and further wherein aspect ratio adjustment data is utilized for image integration processing and further wherein an image arrangement position adjusting mechanism automatically adjusts a relative position of the plurality of images;

demultiplexing the main image or images and the encoded image data from the inputted composite image;

decoding the encoded image demultiplexed by the process at the demultiplexing step to reproduce incidental information, and further wherein the encoded incidental information image data is in a form that may be directly translated back into the incidental information from the encoded image data; and reproducing the one or more main images demultiplexed by the process at the demultiplexing step based on the decoded incidental information in order to provide output image information and the image integration processing section varies a size of the encoded image that is integrated with the main image data so that both longitudinal and lateral sizes of the composite image exhibit a predetermined aspect ratio and a luminance, shape or color of the encoded image define additional information.

14. A computer-readable recording medium having stored therein non-transitory information which when reproduced by a system controlled by a microprocessor automatically transfers into the system and the system displays composite image data formed by integrating one or more main images and encoded incidental image data obtained by encoding incidental information relating to the main image or images, and further wherein the encoded incidental information image data is in a form that may be directly translated back into the incidental information from the encoded image data, wherein at least some of the image data has an aspect ratio that is adjusted for image integration, and further wherein aspect ratio adjustment data is utilized for image integration processing in order to provide output image information and further wherein an image arrangement position adjusting mechanism automatically adjusts a relative position of the plurality of images and the image integration processing section varies a size of the encoded image that is integrated with the main image data so that both longitudinal and lateral sizes of the composite image exhibit a predetermined aspect ratio and a luminance, shape or color of the encoded image define additional information.

15. An electronic memory in a processor controlled system storing an image processing machine executable computer program controlling:

an image inputting electronic processing section for inputting information of one or more images as a main image or images;

an encoding electronic processing section for encoding incidental information relating to the inputted main image or images into image data; and an image integration electronic processing section for integrating the inputted main image or images and the encoded image data obtained by said encoding section so as to be displayed in respective regions of a display screen, and further wherein the encoded incidental information image data is in a form that may be directly translated back into the incidental information, wherein at least some of the image data has an aspect ratio that is adjusted for image integration, and further wherein aspect ratio adjustment data is utilized for image integration processing and further wherein an image arrangement position adjusting mechanism automatically adjusts a relative position of the plurality of images and the image integration processing section varies a size of the encoded image that is integrated with the main image data so that both longitudinal and lateral sizes of the composite image exhibit a predetermined aspect ratio and a luminance, shape or color of the encoded image define additional information.

16. An electronic memory in a processor controlled system storing an image reproduction machine executable computer program controlling:

a composite image inputting electronic processing section for inputting a composite image formed by integrating one or more main images and encoded image data obtained by encoding incidental information relating to the main image or images so as to be displayed in respective regions of a display screen, wherein at least some of the image data has an aspect ratio that is adjusted for image integration, and further wherein aspect ratio adjustment data is utilized for image integration processing and further wherein an image arrangement position adjusting mechanism automatically adjusts a relative position of the plurality of images;

a demultiplexing electronic processing section for demultiplexing the main image or images and the encoded image data from the inputted composite image;

a decoding electronic processing section for decoding the encoded image demultiplexed by said demultiplexing electronic processing section to reproduce incidental information; and an image conversion electronic processing section for reproducing one or more main images demultiplexed by said demultiplexing electronic processing section based on the incidental information decoded by said decoding electronic processing section, and further wherein the encoded incidental information image data is in a form that may be directly translated back into the incidental information from the encoded image data and the image integration processing section varies a size of the encoded image that is integrated with the main image data so that both longitudinal and lateral sizes of the composite image exhibit a predetermined aspect ratio and a luminance, shape or color of the encoded image define additional information.

* * * * *